US010845963B2

(12) United States Patent
Chapman

(10) Patent No.: US 10,845,963 B2
(45) Date of Patent: Nov. 24, 2020

(54) SYSTEMS FOR RAPID DEVELOPMENT AND DELIVERY OF INTERACTIVE CONTENT

(71) Applicant: ROCKETCHICKEN INTERACTIVE INC., Burnaby (CA)

(72) Inventor: Ryan Chapman, Burnaby (CA)

(73) Assignee: RocketChicken Interactive Inc., Burnaby (CA)

( * ) Notice: Subject to any disclaimer, the term of this patent is extended or adjusted under 35 U.S.C. 154(b) by 220 days.

(21) Appl. No.: 15/555,181

(22) PCT Filed: Mar. 4, 2016

(86) PCT No.: PCT/CA2016/050240
§ 371 (c)(1),
(2) Date: Sep. 1, 2017

(87) PCT Pub. No.: WO2016/138595
PCT Pub. Date: Sep. 9, 2016

(65) Prior Publication Data
US 2018/0074668 A1    Mar. 15, 2018

Related U.S. Application Data

(60) Provisional application No. 62/128,063, filed on Mar. 4, 2015.

(51) Int. Cl.
| G06F 3/0484 | (2013.01) |
| G06F 16/951 | (2019.01) |
| G06F 8/34 | (2018.01) |
| A63F 13/23 | (2014.01) |
| G06F 8/20 | (2018.01) |

(52) U.S. Cl.
CPC ............ *G06F 3/0484* (2013.01); *A63F 13/23* (2014.09); *G06F 8/20* (2013.01); *G06F 8/34* (2013.01); *G06F 16/951* (2019.01)

(58) Field of Classification Search
CPC .......... G06F 3/0484; G06F 9/44; G06F 17/30
See application file for complete search history.

(56) References Cited

U.S. PATENT DOCUMENTS

| 7,596,540 B2 | 9/2009 | Tzruya et al. |
| 2009/0002191 A1 * | 1/2009 | Kitaura .............. H04N 5/44513 340/12.26 |

(Continued)

*Primary Examiner* — David E Choi
(74) *Attorney, Agent, or Firm* — Oyen Wiggs Green & Mutala LLP

(57) ABSTRACT

A system for authoring interactive applications has a user interface that allows a designer to set conditions of a range of types. The conditions may be predefined and selected using a drop-down list for example. The designer can select resources that are activated when the conditions are satisfied. A script records the conditions and the resources. The script may be made up of frames. A frame may have a precondition, a selector node and a link identifying a resource. The selector node may include selectors which modify attributes of the resource when selector conditions are satisfied. Selectors may be used to make an interactive application change dynamically in response to any of a wide range of factors. A playback application may be used to deliver the interactive application. The playback system may include a plurality of condition monitors each configured to evaluate conditions of a particular type.

28 Claims, 12 Drawing Sheets

(56) References Cited

U.S. PATENT DOCUMENTS

| | | | |
|---|---|---|---|
| 2009/0054140 A1* | 2/2009 | Beser | A63F 13/12 |
| | | | 463/31 |
| 2009/0124339 A1* | 5/2009 | Barton | G07F 17/32 |
| | | | 463/20 |
| 2009/0217302 A1* | 8/2009 | Grechanik | G06F 8/70 |
| | | | 719/320 |
| 2009/0282364 A1* | 11/2009 | White | G06F 17/24 |
| | | | 715/804 |
| 2012/0150436 A1* | 6/2012 | Rossano | G01C 21/3676 |
| | | | 701/450 |
| 2013/0080874 A1* | 3/2013 | Coleman | G06F 16/972 |
| | | | 715/234 |
| 2014/0379586 A1* | 12/2014 | Sawyer | H04L 67/00 |
| | | | 705/301 |
| 2018/0074668 A1* | 3/2018 | Chapman | G06F 8/34 |

* cited by examiner

LOCATION TASK

TASK NAME [            ]

LOCATION     VARIABLE ○    SPECIFIC ●
LOCATION TYPE   [ BANK x   ATM x   ▼ ]

ACTION RANGE   [    ] m

ACTION         [        ▼]

COLLECTIBLE    [        ▼]

TRIGGERED CONTENT   INTRO     [       ▼]
                    IN_RANGE  [         ▼]
                    COMPLETE  [         ▼]

SYSTEMS FOR RAPID DEVELOPMENT AND DELIVERY OF INTERACTIVE CONTENT

CROSS REFERENCE TO RELATED APPLICATION

This application claims priority from U.S. Application No. 62/128,063 filed 4 Mar. 2015. For purposes of the United States, this application claims the benefit under 35 U.S.C. § 119 of U.S. Application No. 62/128,063 filed 4 Mar. 2015 and entitled SYSTEMS FOR RAPID DEVELOPMENT AND DELIVERY OF INTERACTIVE CONTENT which is hereby incorporated herein by reference for all purposes.

FIELD

This invention relates to the creation and delivery of interactive applications. Games are one example of interactive applications.

BACKGROUND

Developing an interactive application involves both designing the interactive application and implementing the design. It is common that these aspects of creating interactive applications are done by different people. Implementation is typically performed by computer programmers who write computer programs to implement the logic specified by the application designer. This process can be inefficient in part because writing software to implement complicated logic is time consuming. It can take programmers a long time to implement even small changes in logic requested by a designer. This can slow the development effort.

Once such an interactive application has been created users may obtain copies of the application to run it by downloading or otherwise obtaining it. Such applications can be large. Each interactive application created in this manner is unique and so if a user wishes to run a different interactive application the user must download or otherwise obtain the other application. Obtaining applications in this manner can be undesirably slow for users and may involve undesirably large data consumption.

If a programmer wishes to make changes to an application that has been downloaded by users, the programmer may prepare a new version of the application and issue it to the users, usually via the same channel as the original application. This process can take an undesirably long time.

There is a need for alternative methods and tools for generating and delivering interactive content.

SUMMARY

Various aspects and example embodiments are illustrated in the accompanying drawings and/or described in the following description. The invention has a range of aspects that include without limitation:
  Apparatus for delivering interactive content;
  Methods for delivering interactive content;
  Apparatus for generating interactive content;
  Methods for generating interactive content;
  A script structure for representing and distributing interactive content;
  Methods for using a script to direct the reproduction of interactive content;
  Apparatus and methods for processing conditions controlling reproduction of interactive content.

Example aspects of the invention include the following. One aspect provides apparatus for delivering content to a user. The apparatus comprises a data processor; a data store operative to store a script comprising a plurality of conditions of a plurality of types and a plurality of resources associated with the plurality of conditions. A script processor comprises executable computer code operative to process the script when executed by the data processor. The script processor is configured to activate one of the resources when a corresponding one of the plurality of conditions is satisfied. The apparatus includes a plurality of condition monitors. Each of the condition monitors comprises executable computer code operative to evaluate conditions of one of the plurality of types when executed by the data processor and to communicate to the script processor when any of the conditions of the one of the plurality of types is satisfied. The apparatus includes a display. For at least some of the resources, activating the resource comprises displaying information corresponding to the resource on the display or playing sounds by way of an audio interface.

In some embodiments the script comprises a plurality of frames and each of one or more of the frames comprises a corresponding one of the plurality of conditions as a precondition and is associated with a corresponding one of the resources. Some or all of the frames may optionally comprise post conditions.

In some embodiments at least one of the one or more of the frames comprises a selector operative to set a value of a script variable and wherein for at least one of the resources, activating the resource comprises setting a property of the resource based on the value of the script variable. In some embodiments wherein the selector is one of a plurality of selectors associated with a selector node of the frame. In some embodiments the frame stores a priority order for operation of the plurality of selectors. In some embodiments the frame includes an indication that the plurality of selectors should be operated in a random order and the script processor is configured to determine an order at random for operating the plurality of selectors. In some embodiments each of the plurality of selectors is associated with one of the conditions and the script processor is configured to conditionally execute the selector to set the value of a corresponding script variable depending on whether or not the corresponding condition is satisfied.

In some embodiments the script provides an order for the plurality of selectors, at least some of the plurality of selectors include a selector condition, at least one of the selector conditions is based on a result of executing another one of the plurality of selectors earlier in the order and the script processor is configured to execute the selectors in the order until the script processor detects that the selector condition for the next one of the selectors in the order is not satisfied.

In some embodiments the apparatus comprises a location determination system and a wireless data communication interface, at least a first one of the plurality of selectors is configured to query an internet resource by way of the data communication interface using a current location of the apparatus determined by the location determination system and the first one of the selectors is configured to set a script variable based on a response to the query.

In some embodiments a second one of the plurality of selectors subsequent in the order to the first one of the plurality of selectors is associated with a selector condition that evaluates to TRUE if no response to the query is received or if the response to the query is a null response and the script processor is configured to execute the second one of the plurality of selectors if the selector condition evaluates to TRUE.

In some embodiments the script provides a default value for a script variable and the script processor is configured to set the script variable to the default value if all of the plurality of selectors fail.

In some embodiments the apparatus comprises a location determination system (e.g. GPS). In some embodiments one of the condition monitors is configured to evaluate whether a location determined by the location determination system satisfies a condition.

In some embodiments the apparatus comprises a wireless data communication interface and one or more of the condition monitors is configured to query an internet resource by way of the data communication interface using a current location of the apparatus determined by the location determination system and to evaluate a condition based at least in part on a response to the query received from the internet resource by way of the data communication interface. In some embodiments the internet resource comprises a mapping service and the response to the query comprises a list of one or more establishments located within a threshold distance from the current location of the apparatus. In some embodiments the internet resource comprises a state machine representing a shared state of an interactive application and the response to the query comprises an indication of the shared state. In some embodiments the internet resource comprises a weather service and the response to the query comprises current weather information for the current location of the apparatus. In some embodiments the internet resource comprises a social media site and the response to the query comprises information regarding a member of the social media site. In some embodiments the information regarding the member of the social media site comprises information regarding other members of the social media site who are related to the member of the social media site as friends.

In some embodiments the plurality of condition monitors include two or more condition monitors each configured to evaluate a condition based on a factor selected from the group consisting of: a location of the apparatus; a current time of day; a speed and/or duration of travel of the apparatus; a proximity to a certain location or type of location; a detection of or connection to a particular wireless network; a detection of or connection to a particular device; an image acquired by a camera of the apparatus; an altitude of the apparatus; a current local weather; a current phase of the sun, moon, or other celestial object; whether or not it is daylight or the current time relative to local sunrise or sunset; a sound picked up by a microphone of the apparatus; a source of an telephone call incoming to the apparatus; receipt at the apparatus of an email or other electronic communication; status and/or actions of other users; and status of a user interface of the apparatus. In some embodiments at least one of the conditions is associated with a corresponding default resource and the script processor is configured to activate the default resource if the at least one of the conditions cannot be evaluated.

In some embodiments the condition monitors are independent of one another. In some embodiments each of the condition monitors is provided by a distinct software process.

Another example aspect provides a method for delivering content to a user by way of a portable apparatus. The method comprises: receiving at the portable apparatus a script comprising a plurality of conditions of a plurality of types and a plurality of resources associated with the plurality of conditions; providing the conditions to a plurality of condition monitors in the portable apparatus, each of the condition monitors configured to evaluate conditions of one of the types; and activating one of the resources when one of the condition monitors indicates that a corresponding one of the plurality of conditions is satisfied. For at least some of the resources activating the resource comprises displaying information corresponding to the resource on the display. In some embodiments the script comprises a plurality of frames and each of one or more of the frames comprises a corresponding one of the plurality of conditions as a precondition and is associated with a corresponding one of the resources. In some embodiments at least one of the one or more of the frames comprises a selector operative to set a value of a script variable and for at least one of the resources, activating the resource comprises setting a property of the resource based on the value of the script variable.

In some embodiments the selector is one of a plurality of selectors associated with the frame. In some embodiments the frame stores a priority order for operation of the plurality of selectors and the method processes the plurality of selectors in the order. In some embodiments the frame includes an indication that the plurality of selectors should be operated in a random order and the method comprises processing the plurality of selectors in a randomly determined order. In some embodiments each of the plurality of selectors is associated with a selector condition and the method comprises conditionally executing the selector to set the value of a corresponding script variable depending on whether or not the corresponding selector condition is satisfied. In some embodiments for at least one of the selectors the selector condition is based on an output of a previously-processed selector.

In some embodiments the script provides an order for the plurality of selectors, at least some of the plurality of selectors include a selector condition, at least one of the selector conditions is based on a result of executing another one of the plurality of selectors earlier in the order and method comprises executing the selectors in the order until the selector condition for the next one of the selectors in the order is not satisfied.

In some embodiments processing a first one of the plurality of selectors comprises querying an internet resource using a current location of the portable apparatus and setting a script variable based on a response to the query. In some embodiments a second one of the plurality of selectors subsequent in the order to the first one of the plurality of selectors is associated with a selector condition that evaluates to TRUE if no response to the query is received or if the response to the query is a null response and the method comprises conditionally executing the second one of the plurality of selectors if the selector condition evaluates to TRUE. In some embodiments the script provides a default value for a script variable and the method comprises setting the script variable to the default value if all of the plurality of selectors fail.

In some embodiments one of the condition monitors is configured to evaluate whether a location of the portable apparatus satisfies a condition.

In some embodiments one or more of the condition monitors is configured to query an internet resource using a current location of the portable apparatus and to evaluate a condition based at least in part on a response to the query received from the internet resource by way of the data communication interface. In some embodiments the internet resource comprises a mapping service and the response to the query comprises a list of one or more establishments located within a threshold distance from the current location of the apparatus. In some embodiments the internet resource comprises a state machine representing a shared state of an interactive application and the response to the query comprises an indication of the shared state. In some embodiments the internet resource comprises a weather service and the response to the query comprises current weather information for the current location of the apparatus. In some embodiments wherein the internet resource comprises a social media site and the response to the query comprises information regarding a member of the social media site. In some embodiments the information regarding the member of the social media site comprises information regarding other members of the social media site who are related to the member of the social media site as friends.

In some embodiments the plurality of condition monitors include two or more condition monitors each configured to evaluate a condition based on a factor selected from the group consisting of (or any subset of this group): a location of the apparatus; a current time of day; a speed and/or duration of travel of the apparatus; a proximity to a certain location or type of location; a detection of or connection to a particular wireless network; a detection of or connection to a particular device; an image acquired by a camera of the apparatus; an altitude of the apparatus; a current local weather; a current phase of the sun, moon, or other celestial object; whether or not it is daylight or the current time relative to local sunrise or sunset; a sound picked up by a microphone of the apparatus; a source of an telephone call incoming to the apparatus; receipt at the apparatus of an email or other electronic communication; status and/or actions of other users; and status of a user interface of the apparatus.

In some embodiments at least one of the conditions is associated with a corresponding default resource and the script processor is configured to activate the default resource if the at least one of the conditions cannot be evaluated.

Another aspect provides apparatus useful for authoring computer-delivered interactive content. The apparatus comprises a user interface providing controls for configuring a frame of a script. The frame comprises a precondition; one or more selectors; and a linked resource. The user interface controls comprise controls operative to: select a type for the precondition from among a plurality of predefined types and one or more type-dependent parameters for the precondition; select a type or types for the one or more selectors from among a plurality of predefined selector types and specify corresponding values for one or more script variables to be output by the one or more selectors; and select a resource to be linked to the frame. The apparatus further comprises a data processor configured by executable code to generate a script based on the control inputs the script comprising a plurality of frames wherein at least one of the frames comprises a precondition having a selected type, a selector of the selected type and a link to a selected resource.

In some embodiments the script comprises a root frame and a plurality of frames directly or indirectly related as sub-frames of the root frame.

In some embodiments the predefined selector types include a selector type that returns a list of businesses of a specified type in the vicinity of a specified location.

In some embodiments the predefined selector types include a selector type that returns a current weather at a specified location. In some embodiments the predefined selector types include a selector type that returns a current time.

In some embodiments the frame includes a selector condition associated with the selector and the user interface comprises a control operative to select a type for the selector condition.

In some embodiments the data processor is configured to store the script as a set of data structures using JSON (JavaScript Object Notation).

Another example aspect provides a method for providing computer-delivered interactive content. The method comprises: receiving at a user interface user control inputs and configuring a frame of a script based on the user control inputs. The frame comprises: a precondition; one or more selectors; and a linked resource. The user control inputs comprise: one or more inputs selecting a type for the precondition from among a plurality of predefined types and one or more type-dependent parameters for the precondition; one or more inputs selecting a type or types for the one or more selectors from among a plurality of predefined selector types and corresponding values for one or more script variables to be output by the one or more selectors; and one or more inputs selecting a resource to be linked to the frame. The method comprises generating a script based on the control inputs the script comprising a plurality of frames wherein one of the frames comprises a precondition having a selected type, a selector of the selected type and a link to a selected resource; and making the script available for download on a server computer.

In some embodiments the selector of the one of the frames is associated with a selector condition and the method comprises setting the selector condition based upon the user control inputs.

In some embodiments the selector of the one of the frames is one of a plurality of selectors all associated with the at least one of the frames and each of the selectors is associated with a different selector condition and the method comprises setting the selector conditions based on the user control inputs.

In some embodiments the type-dependent parameters comprise factors selected from the group consisting of:
  a location of a device executing the script;
  a time of day;
  speed and/or duration of travel of the device executing the script;
  proximity of the device executing the script to a certain location or type of location;
  detection of or connection of the device executing the script to a particular wireless network;
  detection of or connection of the device executing the script to a particular device;
  an image for comparison to an image acquired by a camera of the device executing the script;
  an altitude of the device executing the script;
  a current weather local to the device executing the script;
  a current phase of the sun, moon, or other celestial object;
  whether or not it is daylight at the location of the device executing the script;
  the current time relative to sunrise or sunset at the location of the device executing the script;
  a sound for comparison to a sound picked up by a microphone of the device executing the script; and
  a source of a telephone call incoming to the device executing the script.

Another example aspect provides a method for delivering an interactive media application. The method comprises: providing a script comprising a plurality of frames to a portable computing device, each of the plurality of frames associated with a corresponding precondition; simultaneously monitoring the preconditions for the frames at the portable device; upon any of the preconditions evaluating to TRUE executing the corresponding frame.

In some embodiments executing the frame comprises activating a resource associated with the frame. In some embodiments executing the frame comprises activating a selector associated with the frame and modifying an attribute of the resource associated with the frame before activating the resource associated with the frame. In some embodiments the frame is associated with a plurality of selectors, some or all of the selectors are associated with a corresponding selector condition wherein the method comprises activating any of the selectors for which the selector condition evaluates to TRUE. In some embodiments the frame stores a priority order for operation of the plurality of selectors and the method comprises activating the plurality of selectors in the priority order.

In some embodiments the method comprises activating the plurality of selectors in a random order. In some embodiments the script provides an order for the plurality of selectors, at least some of the plurality of selectors include a selector condition, at least one of the selector conditions is based on a result of executing another one of the plurality of selectors earlier in the order and the method comprises executing the selectors in the order until the selector condition for a next one of the selectors in the order does not evaluate to TRUE.

In some embodiments the selector is configured to query an internet resource and to set a script variable based on a response to the query. In some embodiments the method comprises activating another selector associated with the frame if no response to the query is received or if the response to the query is a null response. In some embodiments the script provides a default value for a script variable and the method comprises setting the script variable to the default value if all of the plurality of selectors fail.

In some embodiments the preconditions include preconditions of a plurality of types and monitoring the preconditions comprises providing the preconditions to a plurality of condition monitors, each of the condition monitors comprising executable computer code operative to evaluate preconditions of one of the plurality of types when executed by a data processor. In some embodiments the preconditions include preconditions of a plurality of types and for the preconditions of one of the types the method involves querying an internet resource and evaluating the condition based on a response to the querying.

Another example aspect provides a method for evaluating conditions in a computer system. The method comprises receiving a script comprising a condition and an output wherein the condition comprises a logical statement involving one or more input factors and evaluating the condition. Evaluating the condition comprises identifying in a ranked order one or more data stores which could generate the input factors, attempting to obtain the factors from one or more of the data stores and using the factors from a highest-ranked one of the data stores from which factors were obtained to evaluate the condition. If the condition evaluates to TRUE the output may be delivered to the user. In some embodiments the method involves modifying the output based on which data store each input factor was retrieved from.

Another example aspect provides a method for delivering interactive experiences through a mobile electronic device. The method comprises downloading an application from a server to two or more user devices, where the application includes one or more scripts. At the user devices determining user status data; synchronizing the user status data between all of the user devices and the server; and updating the user status data on the server each time the user status data is changed on any one of the user devices. In some embodiments an interactive application includes one or more conditions dependent on a state of the user status data.

Other aspects of the invention and features of embodiments of the invention are described in the following description and/or illustrated in the accompanying drawings.

BRIEF DESCRIPTION OF THE DRAWINGS

The accompanying drawings illustrate non-limiting example embodiments of the invention.

FIG. 4 is an example of a template that may be used to specify a frame involving a location condition.

DETAILED DESCRIPTION

Figure 1A:
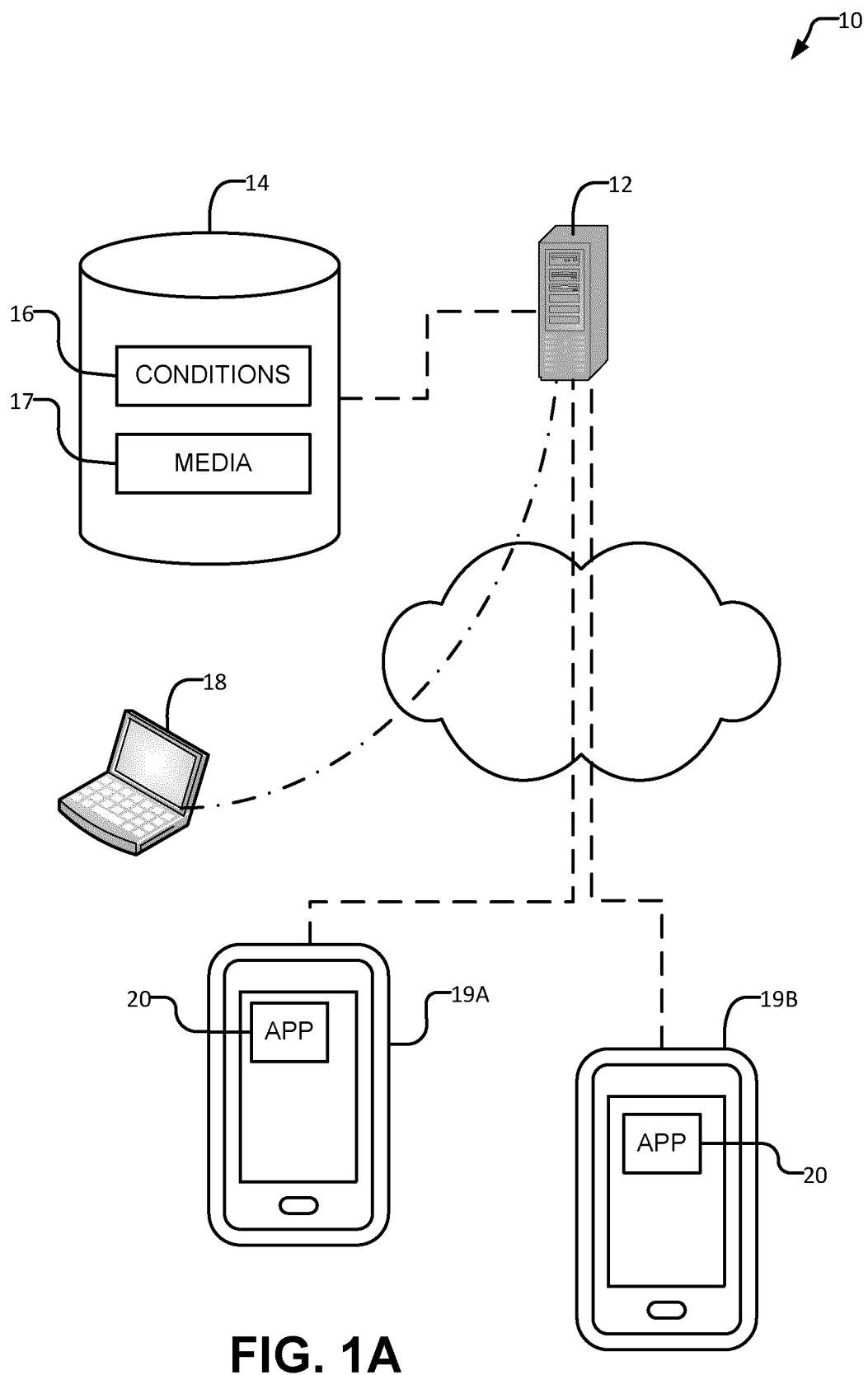
FIG. 1A is a schematic illustration of an overall system that includes facilities for generating and delivering interactive content according to a non-limiting example embodiment.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Embodiments of this invention are useful for implementing interactive systems. One application of the present technology is designing, implementing and presenting interactive games. However, the present technology is not limited to games. Other applications include story-based interactive applications such as flight simulation, ship simulation, plant control simulation, interactive educational lessons, guided tours of places and/or exhibits, tourist guides, interactive guides for servicing and/or repairing equipment and the like.

Some examples of interactive media applications are:
1. story-driven real-world alternate reality games (e.g. CodeRunner™);
2. open world 3D games with "side quests" (e.g. Grand Theft Auto™);
3. character driven role playing games (e.g. Animal Crossing™);
4. adventure games (e.g. King's Quest™);
5. scenario-based training (e.g. flight training done with storytelling);
6. choose-your-own-adventure books; and
7. walking tours that react and adapt to a user's location.

In an interactive system, certain actions are triggered when corresponding conditions are satisfied. Examples of actions that may be triggered are things such as:

displaying visible media such as: a video clip, a message, a control, a graphic, or the like;

triggering a sound which could be a voice recording, a synthesized voice, a sound effect, a sound recording, a chime, beep, or other alert noise, or the like;

changing a mode of operation of an apparatus or component of an apparatus;

generating a tactile signal such as a vibration or the like;

generating an olfactory signal;

actuating a software application or shifting focus to a software application;

setting a value for a condition that may be an input to other conditions;

combinations of one or more of the above;

and the like.

Actions of a given type may be delivered in different ways. For example, video content may be delivered using different players for video content or on a device or set of devices equipped with different displays video content may be delivered by way of one or more of the displays. The experience of a user may be altered depending on which player is used to deliver the content as well as which device (e.g. which particular display or displays, which particular sound reproduction system, etc.), are used to deliver the content.

An interactive application may be designed by providing a set of actions (and where applicable the media to which the actions relate) and a set of conditions that define when those actions are to be performed. Conditions may be triggered by any of a wide range of factors and any combination of those factors. Some examples of factors that may trigger conditions include:

a location of a device (for example, as determined by a GPS system);

a time of day;

speed and/or duration of travel;

proximity to a certain location or type of location;

detection of or connection to a particular wireless network;

detection of or connection to a particular device;

image recognition of an image acquired by a camera;

an elevation (e.g. an elevation above sea level);

a current local weather;

a current phase of the sun, moon, or other celestial object;

whether or not it is daylight or the current time relative to local sunrise or sunset;

recognition of a sound picked up by a microphone;

a source of an incoming telephone call;

receipt of an email or other electronic communication;

status of a particular computer application (e.g. a web browser is viewing a specific web page; the other application is running or not running etc.);

the status and actions of other users;

status of a user interface (e.g. the user interface is currently idle or has been idle for some period of time, the user interface is currently receiving input of text, etc.);

combinations of conditions which may include basic conditions of one or more of the above types (such combinations may be called 'compound conditions');

and the like.

The source of a factor may be external to the interactive application. A factor to be used as input for a condition may have more than one source, or combination of sources.

In some embodiments of the present invention a script which specifies the logic of an interactive application (e.g. what conditions determine what content is delivered when) is not required to specify how the conditions will be evaluated, what systems will be used to evaluate the conditions or how the content will be reproduced. This separation between the specification of the logic that determines what the interactive application will do and the mechanics of how the interactive application will do what the logic requires when the interactive application is played has a number of advantages. These include:

This separation avoids the need for designers to develop logic specifying certain actions without needing to know or work with details regarding how the actions will be performed.

The separation allows the mechanics for interpreting the logic and/or performing actions to be changed without changing the logic.

Sources for factors used in evaluating conditions can be dynamic, and may be updated, changed, added, or removed over the life of an interactive application.

The mechanism for connecting to a source or sources and retrieving a factor may be implemented within a system used to play the interactive application. In some embodiments a designer of an interactive application does not need to select or even know which source or sources are used to obtain a factor. For example, it may be possible to determine the current weather at a place by querying any of several online resources. A system administrator may configure the system to use any one or more of these resources in the event that a factor depends on the weather at the place. The designer only needs to select the type of factor for a condition (e.g. the weather) and not the source of the factor.

Similarly, the same logic may be played back using differently configured playback systems that may reference different sources for factors. For example, the system used to play an interactive application by a user in one country or region may be configured to use one source for information regarding the weather and the system used to play the same interactive application by a user in another country or region may be configured to use a different source for information regarding the weather.

Various embodiments of this invention provide an architecture, system, and methods which facilitate the rapid development and maintenance of games and other systems of interactive content. There are a number of aspects of this technology. While these aspects may be used singly in some embodiments, advantageous synergies may be achieved when these aspects are provided together.

One aspect provides a template-based interface which allows designers of interactive content to specify what actions are to be performed and what conditions control the performance of those actions. The templates may be accessed using a simple graphical interface. The interface may permit designers to directly specify conditions and the actions to be triggered when those conditions are satisfied. The interface may be designed such that only valid conditions can be specified.

Providing designers with direct ways to explicitly define actions and the conditions on which those actions will be performed facilitates developing interesting and sophisticated interactive content without significant programming. An example of such an interface is illustrated in FIG. 4. In some embodiments the templates specify parameters for frames that have pre-conditions and post-conditions. The frames are executed when the corresponding pre-condition becomes true. Illustrative examples of such embodiments are described herein. Wizards may be provided to assist designers in specifying conditions and actions corresponding to various tasks that will be included in an interactive application.

Some embodiments allow a designer to specify additional conditions and ways that content should be modified if those additional conditions are satisfied. Such embodiments allow a designer to make an interactive application adaptable to various contexts.

Another aspect provides an architecture for delivering interactive content. The architecture provides a number of condition monitors that evaluate specific types of condition. The condition monitors may be modular. For example, a module may determine whether location conditions are satisfied, another module may determine whether time-based conditions are satisfied, another module may determine whether conditions based on local weather are satisfied and so on. The modules may be quite simple since they can have very limited functionality.

In some embodiments the modules may evaluate the conditions that they are monitoring with a frequency that depends upon how quickly the factors for the conditions that the module is monitoring are expected to change. For example, weather changes relatively slowly. In most cases a module responsible for evaluating conditions such as 'is the local temperature greater than 15 C?' would not need to check the local temperature and evaluate the conditions it is monitoring every second or every minute. Monitoring weather conditions such as temperature less frequently (e.g. a few times per hour) may suffice in many cases.

The same architecture may be applied to deliver a wide range of interactive content. The architecture may comprise a playback application that can be resident on a user device. The playback application may comprise a script engine that interprets scripts as well as a number of monitors which monitor conditions of various types.

Upon commencing an interactive application a playback application supplies the pre-conditions for frames of the interactive application to the appropriate modules (depending on the type of conditions specified). The modules may notify the playback application when the pre-conditions are satisfied. Upon all preconditions for a frame being satisfied the playback application may initiate an action specified by the frame.

Another aspect provides an overall architecture in which scripts which specify interactive applications are hosted such that they are accessible by way of the internet or another computer network. Users may execute the interactive applications on their own computing devices. The computing devices may include portable devices such as smartphones. The user devices may include software configured to execute a wide variety of interactive applications. A designer may edit, replace or otherwise modify the scripts such that the behavior of the interactive application is changed for all users.

In some embodiments, the interactive content is downloaded to a user's computing device, and all processing of the scripts takes place on the user's device. Any conditions in the scripts may have defaults to be used in cases where the condition cannot be evaluated (e.g. in the event that evaluating a condition normally involves accessing a resource on the Internet and the Internet is inaccessible to the user's computing device). This allows for execution of the interactive content even without Internet access, or with only intermittent Internet access.

In some embodiments, interactive content is delivered to a user by way of a portable device such as a smartphone, portable computer, or the like. For many applications, the portable device includes a location sensing device such as a GPS receiver and/or a device that senses local wireless network or telephone cellular network signals.

In an example embodiment, the interactive content is content for a game. The interactive content may instruct the user to go to certain locations and/or take certain actions. When the user does so, the portable device may detect when the user has arrived at indicated locations or taken the certain actions and may deliver further interactive content. The particular interactive content that the user receives may vary in any of a wide variety of ways, depending on the conditions that have been set by the designers for the delivery of the interactive content.

FIG. 1A illustrates a system 10 according to an example embodiment. A server 12 has access to a data store 14 which includes condition information 16 and media elements 17. A designer 18 may create and edit condition information 16 and media elements 17, for example as described below. Users have portable devices 19. Devices 19A and 19B are shown in FIG. 1A. Each device 19 runs a playback application (or 'player') 20.

Devices 19 may, for example, be smartphones running applications. The smartphones may run operating systems such as the Apple™ iOS™ operating system, the Google™ Android™ operating system, the Microsoft™ operating system, or the like.

Apps 20 executing on devices 19 receive conditions 16 for particular interactive applications and determine when the conditions 16 are satisfied. When a condition 16 is satisfied, the app 20 performs a corresponding action which may involve delivering interactive content by way of the device 19. The content may provide any of the types of interaction described above, for example. In some cases, completion of the corresponding action may be a condition for performance of a further action.

App 20 may include a script processor that receives and processes scripts which control the delivery of interactive content by app 20. The scripts provide a framework for conveying the logic of an application as well as identifying specific content to be delivered when the interactive application is played back.

In some embodiments, a designer 18 creates an interactive application by writing a script. The script specifies conditions and the corresponding actions that are taken in response to those conditions being satisfied. In some embodiments, the script comprises a number of frames, which are structured templates which facilitate defining certain conditions and the actions taken in response to those conditions being satisfied. A designer can create an interactive application by creating a script made up of a set of frames.

Server 12 may include a visual authoring tool that allows user 18 to define conditions 16 and corresponding actions by interacting with visual objects. The tool may provide a range of predefined conditions, for example.

Figure 1B:
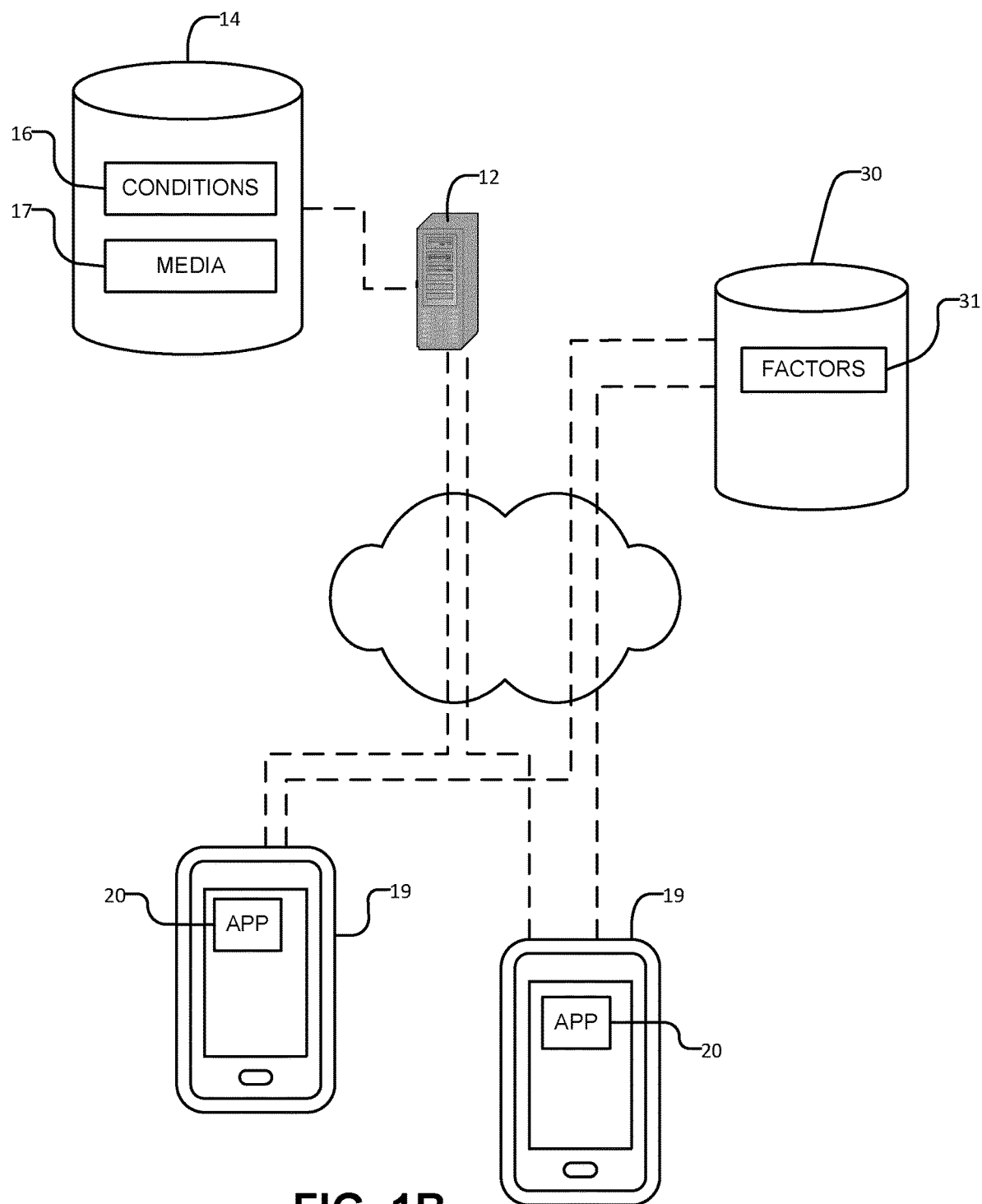
FIG. 1B is a schematic illustration of an alternative system that includes facilities for generating and delivering interactive content and factors.

FIG. 1B illustrates an alternative embodiment, where apps 20 executing on devices 19 first connect to server 12, and download conditions 16 and media 17 from data store 14. In determining if conditions 16 have been satisfied, apps 20 may connect to one or more sources 30 and retrieve factors 31 as inputs to conditions 16.

Figure 1C:
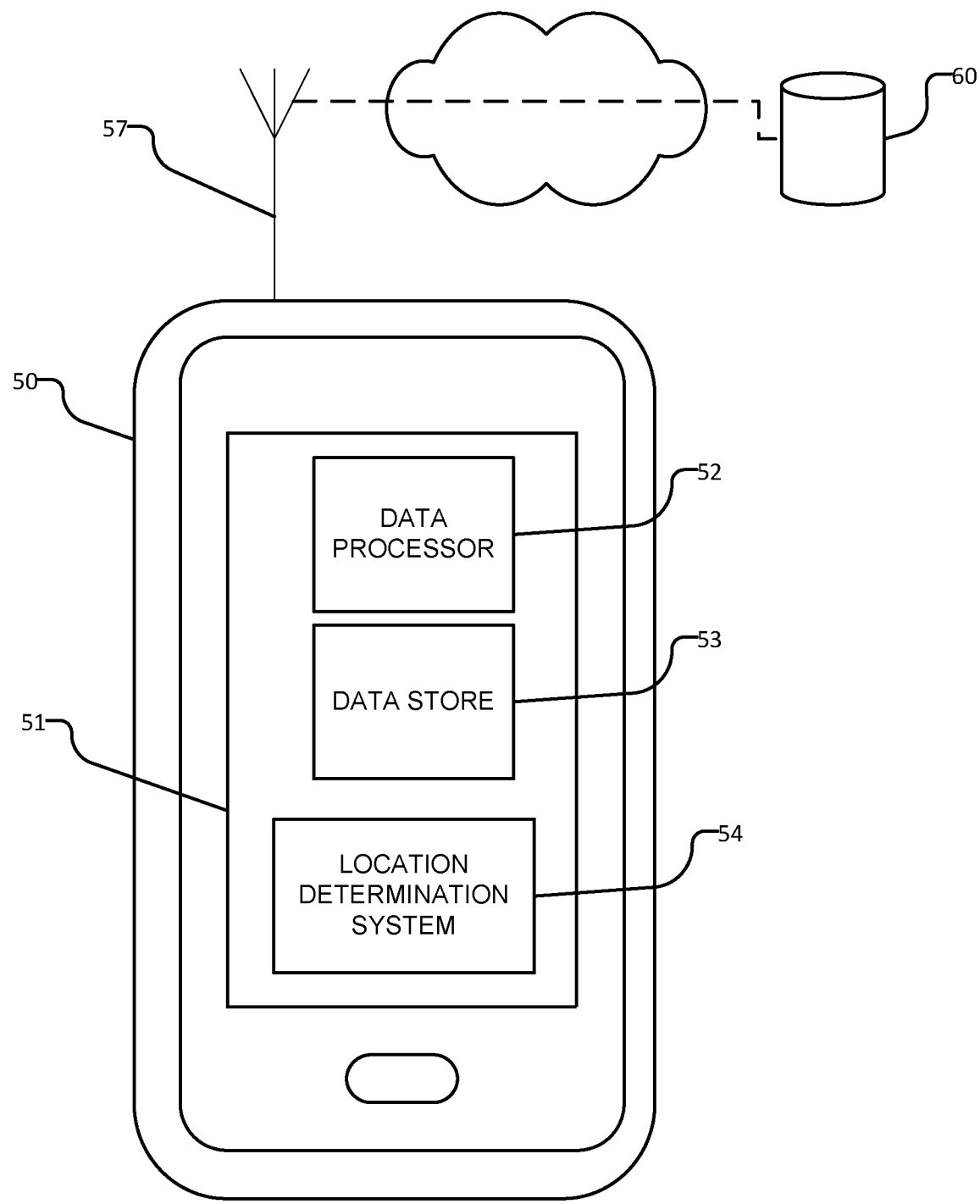
FIG. 1C is a schematic illustration of a user device configured to deliver interactive content.

FIG. 1C illustrates a portable user device 50 comprising a display 51, a location determination system 54, a data processor 52, a data store 53, and a wireless data communication interface 57. Data store 53 may contain computer executable instructions (e.g. in the form of an app) that cause data processor 52 to perform methods as described herein to deliver interactive media applications. The wireless data communication interface 57 communicates with internet resource 60.

The following description explains various features of an example set of interactive application authoring tools called Motive™ which represents one example embodiment which implements certain aspects of the invention in particular ways. Many other implementations are possible.

Motive provides a set of tools designed for building interactive media applications. Motive incorporates a scripting language, MotiveScript™. MotiveScript is specifically designed to:

1. describe complex interactive media scenarios that react to user input and the state of the user's game or environment;
2. be authored using visual tools (like the Motive Authoring Portal web interface); and
3. facilitate on demand delivery from a web server to a deployed playback application without building a new binary.

MotiveScript provides a scripting language that is designed to allow users with limited technical ability to author multimedia applications graphically. MotiveScript automates many processes that would otherwise require a skilled programmer.

Condition Processing

Motive implements general-purposed condition processing that can handle either EVALUATE or WAIT semantics:
IF EVALUATE (condition)
THEN (take action)
ELSE (WAIT until condition THEN take action)
The condition processing may evaluate:
compound conditions (sets of conditions combined with logical operators (e.g. AND, OR);
negated conditions (unary NOT); and
any combinations of the above.

To facilitate handling multiple conditions while avoiding race conditions, condition monitoring is performed by condition monitors. Each condition monitor may provide a strict, but simple, interface protocol. The condition monitors may implement both EVALUATE and WAIT semantics. Providing such condition monitors can accommodate conditions that become true at different times without the overhead of requiring a processor to regularly poll all of the conditions.

The condition monitors may operate independently from one another. In some example embodiments each condition monitor is implemented by computer-readable instructions executed by a data processor. Each condition monitor may involve a separate software process.

Parallel, Branching "Threads" of Execution

Motive scripts allow multiple parallel frames to be executed simultaneously and to have multiple frames waiting on preconditions at the same time. Any frame can open at any time. Launch of one frame may potentially make one or multiple other frames (sub-frames) available to be launched, etc. Any frame may launch a new thread of execution (which may be specified e.g. by a number of sub-frames). Note that "thread" is used here to mean a path of script execution that may expose a user to various experiences in response to various conditions. Thread is not used here to mean an operating system "thread."

Object Variable Mapping (Adaptive Content)

Objects in the system may be altered as a script is processed. For example, the text of a message that a character sends may say "Good Morning" or "Good Evening" depending on the time of day.

The Motive script processor allows such alterations to be defined through a graphical editor. In Motive, any field of any object can be overwritten by a dynamic value. This "adaptive content" applies not only to resources, but also conditions and selectors, meaning that the behavior of the script can be radically altered in a very natural way.

Adaptive content may also be streamed, so that properties are not just set once, but are dynamic and change over time as conditions change.

Maintaining State

A problem often encountered in software design is how to store and retrieve the state of a system so that an application can continue seamlessly even after the device is operating on is rebooted. Reconstructing a user's position in a long, branching narrative experience can be very challenging. The Motive script processor maintains the state of every running script in the system and is able to reconstruct the state with high performance and minimal overhead after a reboot. This may be done, for example, by keeping a log of which frames of a script are currently active. The system can handle targeted "resets" of scripts or parts of scripts. The result is a system that "naturally" picks up where the user left off after a reboot.

Architecture

A significant innovation in Motive is the design of the scripting language itself. The elements of the design (conditions, resources, selectors, scripts, frames) are built to map sophisticated programmatic behavior into a representation that can be understood by the layperson. Each element has a well-defined set of behaviors that drive the programmatic behavior and at the same time are meaningful to the user. The architecture that binds these elements together yields a specific implementation that overcomes many technical challenges.

Device Interoperability

Motive is designed to be hardware and device agnostic, so that the design of a script does not depend on the system it will run on. This allows Motive to be used to author content for a wide range of platforms, without designers needing to know specifics about the end user devices and without requiring scripts to be modified for use on different end user devices.

Interaction Among Users

Motive makes it simple to coordinate an experience among multiple users. It does this by providing a configurable state machine on shared data. The state of the state machine for an interactive application may, for example, be determined based on what frames of the interactive application are currently active on the devices of a certain set of users. The state machine may be provided by an Internet-connected server for example.

Designers can create an "activity feed", and then configure a state machine that defines how users interact with that feed. This creates a shared state for all users and coordinates activities among users.

Data Flow Definition and Display

Motive has the ability to define data flows through the system, and expose these flows to the designer. For example the system may include a facility for producing set locations. The designer has no need to know how this facility functions. A designer creating a Motive application may search for and filter lists of locations to obtain selected locations using the facility. The designer may then direct the selected locations through the system to specific endpoints for use. In addition or in the alternative the designer may take particular attributes out of a set of locations or other results and assign them to variables or other adaptive fields.

Scripts

In the Motive system, interactive applications are made up of one or more scripts. The Motive system includes playback applications which include a script processor. Scripts intended for execution by the script processor have a specific structure. Each script is made up of one or more frames. Each script has several basic properties: a root frame and an optional list of variables.

A script may be represented as a data structure. The data structure may include fields that contain information regarding the script generally and other fields that provide information regarding components of the script such as frames. In an example embodiment the script includes the following general information:

ScriptId—An unique ID for a script which permits the script to be unambiguously identified within the system.

ApplicationId—An ID that associates the script with a particular Motive application.

Name—The name of the script.

RootFrame—The id of the root frame.

CreatedOn—the date & time the script was created.

ModifiedOn—the date & time the last time the script was modified.

Script Variables—an array of variables. These variables can be used within other components of the script. A variable stores a value. The value may become available or defined only after the script processor has interpreted the script.

Frames

Each script has a root frame. Scripts may also comprise other frames in addition to the root frame. Each frame contains a number of different components. Not all components are defined for every frame. For example, certain frames may not have any selector nodes defined. In an example embodiment each frame can accommodate at least the following information:

Precondition—A logical expression which evaluates to TRUE or FALSE. In some embodiments the contents of a frame are not processed until after the precondition evaluates to TRUE.

Selector Nodes—Each selector node contains a condition, a selector and any number of child selector nodes. A selector may be used to set a value for an attribute or parameter. A selector node may be used to contextualize content which is being delivered by the script. For example, a user authoring a script may wish a story character to say something different depending on the time of day (e.g. "Good Morning", "Good Afternoon", "Good Evening"). The author cannot know in advance what time of day the user will experience the content. Selector nodes allow the author to specify conditions which correspond with a number of different scenarios specified by selectors. The conditions determine when each selector will be used. In the above example, three selector nodes could be created. Each selector node could have a condition to check if the time was before noon, between 12:01 pm and 6 pm or after 6 pm respectively. The selector contained within each selector node would define the text to be used in each case. A selector node may optionally contain a set of two or more selectors.

Required variables—A list of script variables that must be set in order for frame processing to continue past the selector phase.

Resources—A resource can be any of a wide variety of things. A resource may be any object which is activated after the frame precondition evaluates to TRUE. Examples of resources are: a task for a user (i.e. Take an action, acquire something, deliver something, etc.), a piece of content (e.g. audio, video, image) to play or display, an item to add to the player's inventory, etc. Resources can also be used to load other scripts, direct the user to another point in the story or send information to the interface.

Sub Frames—A sub frame is a frame that is the child of another frame. A sub-frame is processed once the precondition of the parent frame is met and the precondition of the sub-frame is also met.

Postcondition—A logical expression which evaluates to TRUE or FALSE. Once the precondition for a frame has evaluated to TRUE the frame becomes active. The frame will remain active (thus permitting interpretation of the frame's sub-frames) until the postcondition evaluates to TRUE.

Figure 2:
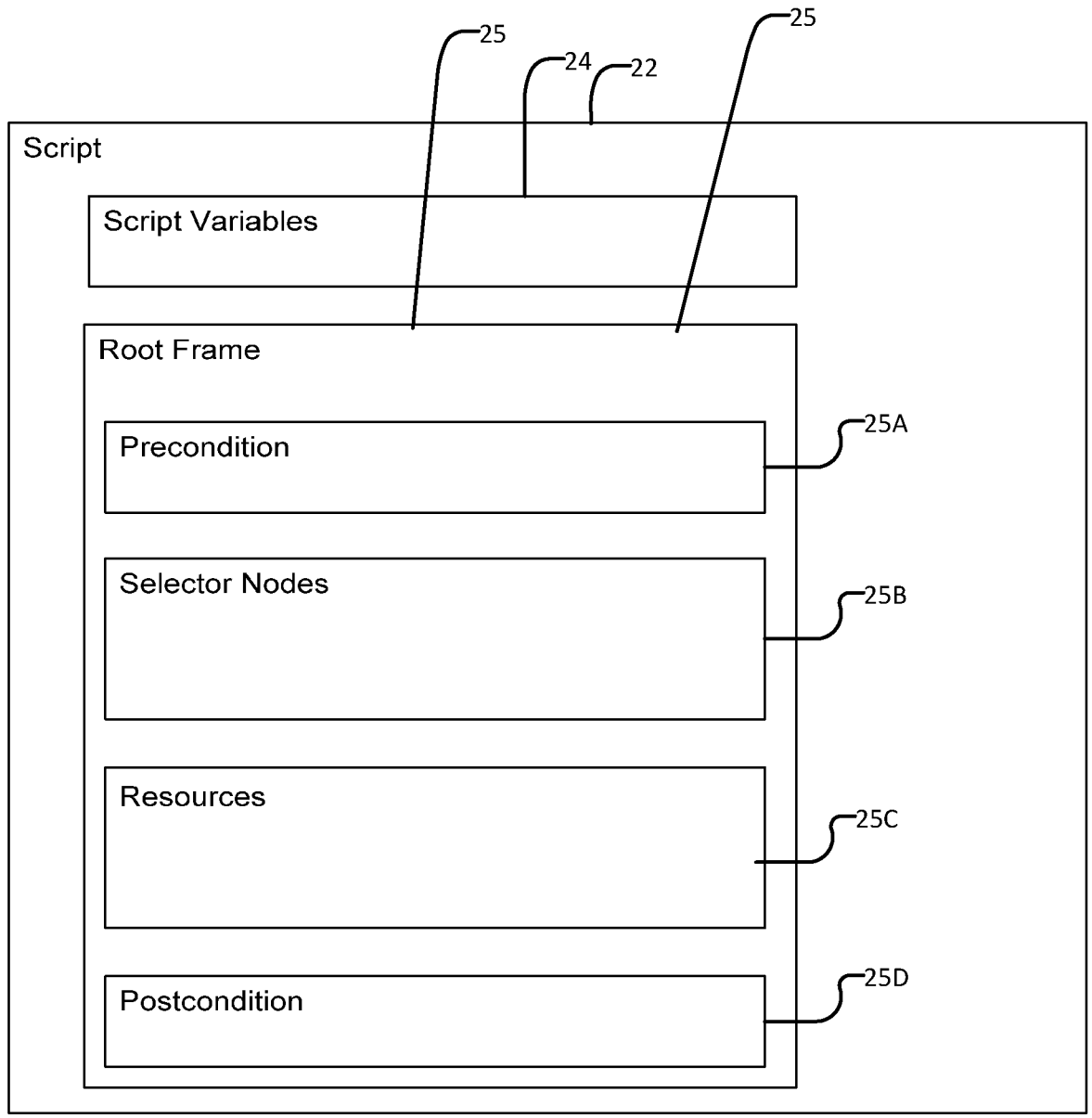
FIG. 2 illustrates an example frame for a script.
Figure 3:
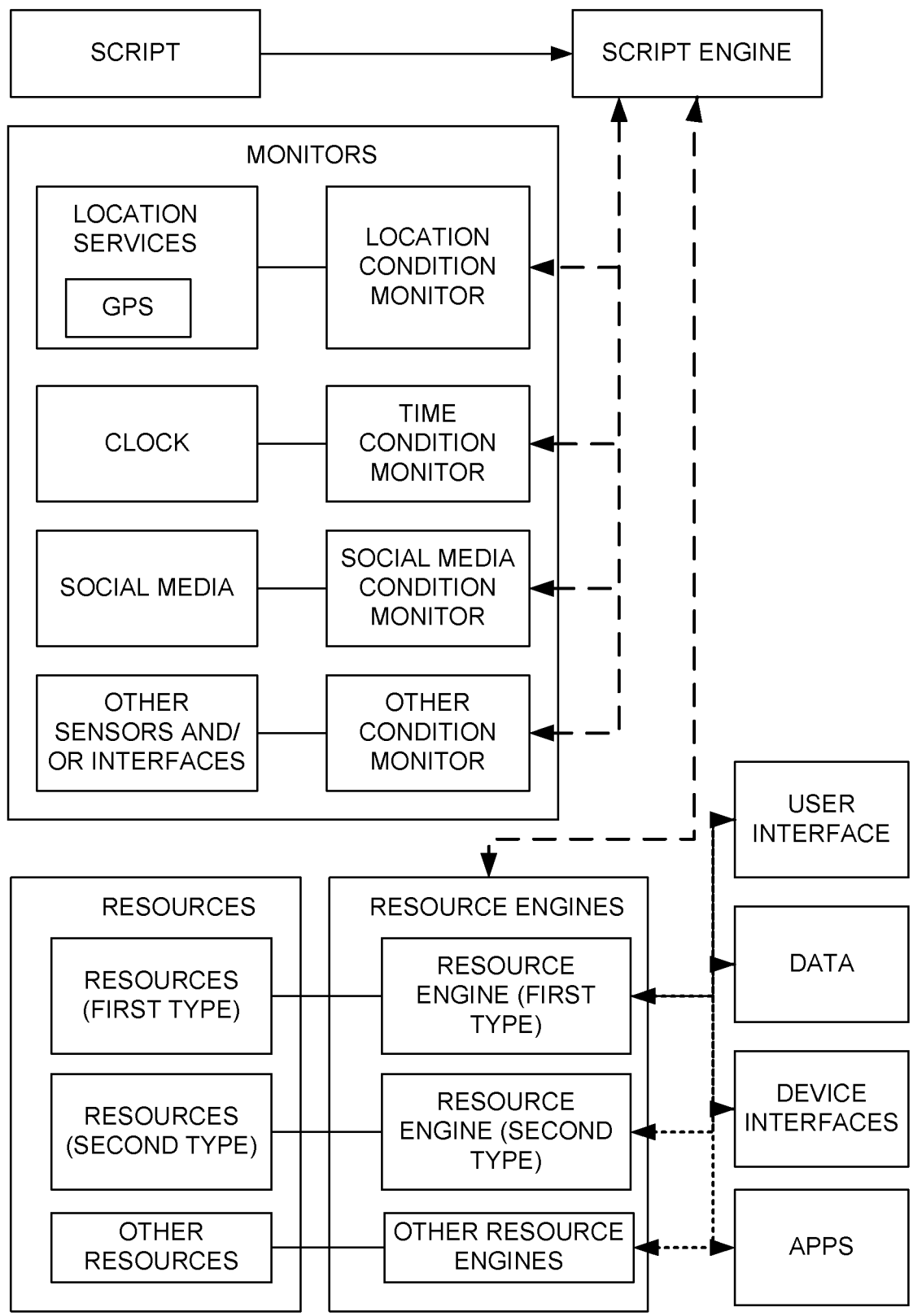
FIG. 3 is a schematic diagram illustrating components of a user device having facilities for delivering interactive content.

Each frame is represented by a data structure that includes fields or other components which represent the different parts of the frame. FIG. 2 illustrates components of an example script 22. Script 22 includes a part 24 which contains script variables and a root frame 25. Root frame 25 illustrates the general makeup of a frame. Root frame 25 includes a precondition 25A, selector nodes 25B, resources 25C and a post-condition 25D.

Any script object in a frame can be altered using "object variable mapping." This process allows a user to change the nature of conditions, selectors, or resources by mapping a variable to a property of that object. Any object property can be overridden. This extends the adaptive content feature by applying it to more types of objects and applying it generally to any field in those objects.

An author may set up a frame to perform some action (e.g. activate a resource) when the precondition is satisfied and optionally to conditionally modify the behavior of the resource using selector nodes. The author may select selector nodes that alter specific attributes of a resource. For example:

where a resource displays text to a user or generates speech messages from text a selector may specify the particular text that will be displayed or rendered as speech when the resource is activated.

where a resource is a video a selector may allow the designer to identify a particular file that will be the source for the video.

where a resource is a media a selector may set a particular effect or filter to apply to the media.

By defining sub-frames the author/designer may allow a user to experience a sequence of actions which may be triggered by conditions brought about by the user's behavior and/or external factors.

In a prototype implementation, data structures are transferred between the service (e.g. server 12) and the client (e.g. a device 19) using JSON (JavaScript Object Notation) and are deserialized into .NET objects on the client. This particular implementation is not required. For example the data could be transported using Protocol Buffers and deserialized into C++ objects.

Data Types

Every data type in the Motive implementation has a "type" parameter and a globally unique "id" parameter.

Script

A Motive script is a data structure that has a single root frame. The script may include a set of Script Variables, and other metadata used by the processor as described herein.

Script Variable

A Script Variable is a named container for data set by selectors. The data stored in a Script Variable are generally used to adapt the behavior of Resources to customize a user's experience.

The data stored in a Script Variable may also be used to adapt the behavior of Selectors or Conditions to customize a user's experience.

Frame

A frame represents a set of one or more "Resources" that are to be activated when the preconditions for the frame are met.

Scripts, script variables and frames may all be concrete data types which are not intended to be modified or extended by an end user.

Condition

A condition is an abstract data type. A range of concrete implementations of the condition data type are possible. Each of these implementations may correspond to a different type of condition. The Motive SDK provides predefined concrete implementations for many conditions. In some embodiments a user is free to extend these implementations and add their own. Each condition type is associated with a "Condition Monitor" that can interpret the fields in the condition structure and can evaluate whether the condition is met (e.g. whether or not the condition evaluates to TRUE).

Conditions are used in frames (precondition, postcondition) and in selector nodes. A condition associated with a selector (e.g. by a selector node) may be called a 'selector condition'.

A condition may be a simple condition based on a single parameter or a "compound condition." A compound condition contains a collection of sub-conditions and an operator (e.g. "and" or "or") that defines how to determine if the compound condition is met.

AND: all of the sub-conditions are met.
OR: at least one of the sub-conditions is met.

Because a Compound Condition is a condition as defined above, it can itself be a sub-condition of another compound condition, allowing for arbitrarily complex compound conditions.

Selector Node

A selector node represents a node in a "selector tree." It is a concrete type. The script processor traverses the selector tree as described below to adapt the properties of resources. A selector node has 0 to n selectors that are run if the selector node's condition evaluates to true.

Selector

A selector is an abstract data type that needs to have a concrete implementation. The Motive SDK (software development kit) provides concrete implementations for many selectors, but the user may extend these implementations and add their own. The primary goal of a selector is to set a Script Variable to be used to adapt the behavior of a resource. Each selector type may be associated with a "Selector Processor" that can interpret the selector and set the associated Script Variable. In some embodiments selectors of a variety of predefined types are provided for selection and each of the predefined types is operable to set one or more particular script variables. In an example embodiment a designer can select a desired selector from e.g. a drop-down list and for selectors of at least some types can provide values for the script variables (e.g. by entering text to be displayed by a resource).

Figure 5:
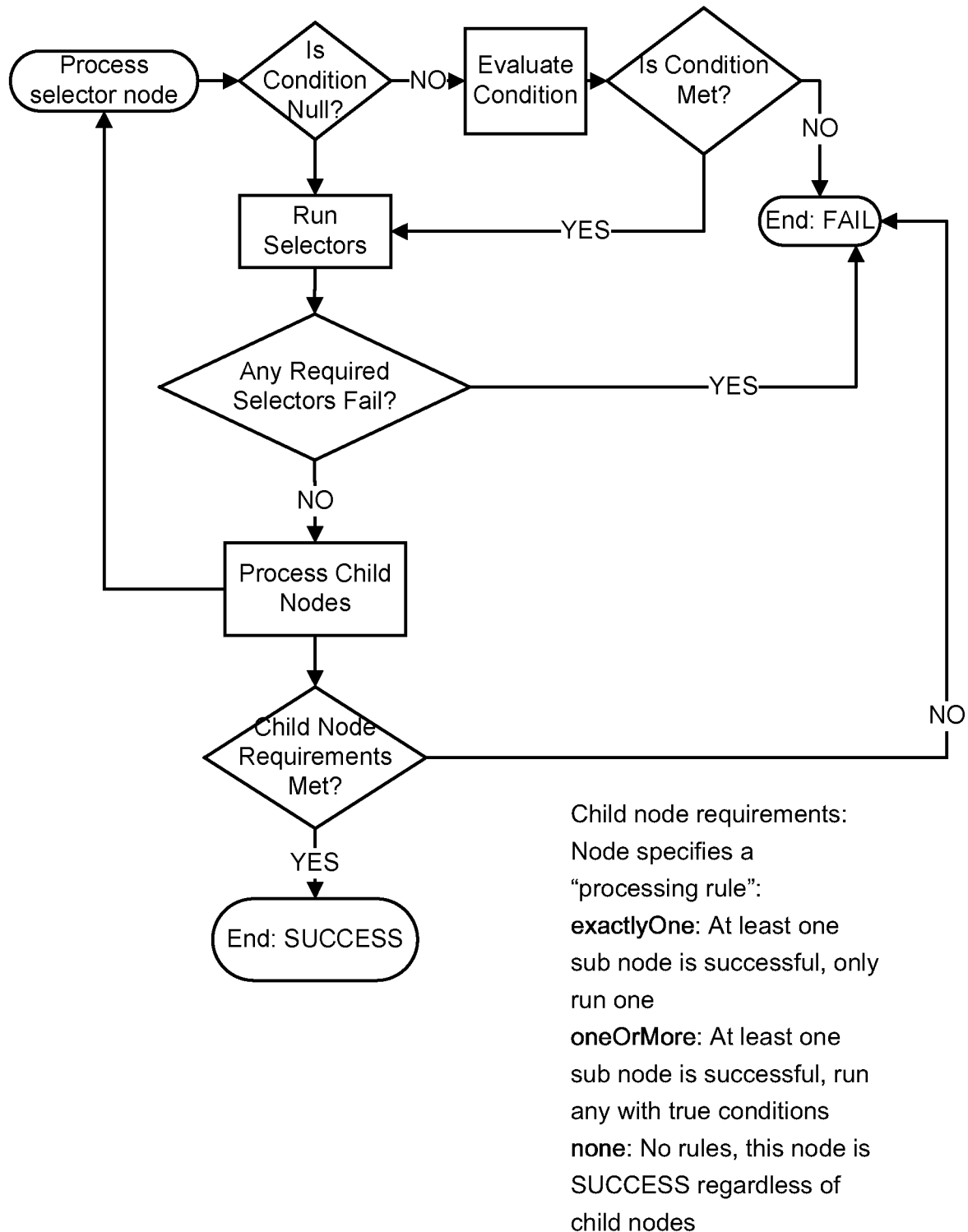
FIG. 5 is a flow chart illustrating an example method for processing selector nodes.

FIG. 5 is a flow chart illustrating a method that may be applied for processing selector nodes.

A selector may also be used to set a Script Variable to be used to adapt the behavior of a condition or another selector.

Resource

A resource is an abstract data type. Concrete implementations of various resource types are possible. The Motive SDK provides concrete implementations for many types of resources. In some embodiments the user is free to extend these implementations and add their own additional resource types. Resources are the main interaction point between the script engine and the app. Each resource type has a corresponding "Resource Processor" that interprets the resource and updates the app state appropriately.

Frame Processing

A script has a single root frame with a tree of 0 to n subframes below it (where n is an integer). The script processor processes each frame as follows:

1. Evaluate precondition and, if not met, optionally wait for the condition to be met (a null precondition is considered to always be met).
2. Process selector nodes. (Halt processing if a required selector fails to process).
3. If processing is halted, raise an error that the selectors failed to process.
4. Activate resources.
5. Process any subframes starting with the first subframe.
6. Wait for postcondition if present. When postcondition is met, "close" frame.
7. On closing a frame:
   a. deactivate all resources activated by the frame; and,
   b. close all subframes of the frame.

In another embodiment, the script processor processes each frame as follows:

1. Apply variable mapping to preconditions.
2. Evaluate precondition and, if not met, optionally wait for the condition to be met (a null precondition is considered to always be met).
3. Process selector nodes.
4. Halt processing if a required variable is not set.
5. If processing is halted, raise an error that the selectors failed to process.
6. Apply variable mapping to resources.
7. Activate resources.
8. Process any subframes starting with the first subframe.
9. Apply variable mapping to postconditions.
10. Wait for postcondition if present. When postcondition is met, "close" frame.
11. On closing a frame:
    a. deactivate all resources activated by the frame; and,
    b. close all subframes of the frame.

Evaluating Conditions

Conditions are arbitrary data objects that hold data that allows a condition monitor (described below) to assess whether or not the condition is met.

Condition Monitors

Conditions are monitored by condition monitors. A condition monitor is a unit that can:

1. Evaluate a condition and return a "true" or "false" response (EVALUATE).
2. Wait for the state of a condition to change and raise an event (WAIT).

It is generally most convenient to implement condition monitors in code executing on a processor. In some embodiments, evaluating individual conditions is quite simple and so the condition monitors may not consume significant computational resources.

Condition monitors support an interface that is recognized by the script engine. The script engine has no other prerequisites for the implementation of a condition monitor outside of those defined by the interface. This means that any question that can be evaluated to TRUE/FALSE by the implementing application can be used as a condition. For example:

1. Location Condition—detecting a user's proximity to a specific location or a type of location.
2. Timeframe Condition—defines windows of time, for example "every weekday between 3 pm and 4 pm", "December 24$^{th}$ at midnight," every Tuesday in January, and so on.
3. Inventory Condition—does the player have a certain number of items of a given type in their inventory?
4. Social Condition—does the player have any friends who have "liked" a certain movie or type of music?
5. etc.

When a condition monitor for a frame condition reports a state change, the script processor re-evaluates the condition (or conditions if it is a compound condition, as described below) to determine if the condition is met and the frame should be opened (if it's a pre-condition) or closed (in the case of a post-condition).

The following section describes an example implementation for condition monitors. In Motive, it is general practice to have one instance of a condition monitor for every condition type. Hence, a condition monitor is designed to handle multiple conditions of a given type. In Motive, the interface for a condition monitor has the following methods (this uses C #notation):

string ConditionType {get; }

This is a read-only property defining the type of condition handled by this monitor.

void WaitForConditionUpdate(FrameOperationContext context, ICondition condition, Action onUpdate);

This instructs the condition monitor to wait for the condition state to update. Note that this does not guarantee the state of the condition when onUpdate is called. For example, it may be expected that a condition that evaluates to FALSE will evaluate to TRUE when onUpdate is called. This may not be the case. Any caller to WaitForConditionUpdate MUST immediately call CheckState to determine the current state of the condition.

context: Information about the current processing context. Includes access to script local storage, script variables, etc.
condition: The condition to monitor.
onUpdate: A callback to invoke when the condition state updates.

void CheckState(FrameOperationContext context, ICondition condition, ConditionCheckStateComplete onComplete);

This asynchronously checks the state of the given condition.

context: Current processing context.
condition: The condition to check.
onComplete: A callback that reports the state of the condition (TRUE/FALSE) and optionally contains a set of results, data objects that represent those items for which the condition holds true. For example, a Location Condition Monitor will evaluate the Location Condition over a specific set of locations (e.g. the location cache or by querying a server) and, if the condition is met for at least a predetermined count of locations, return all of the locations that meet the requirements defined by the Location Condition.

void StopWaiting(FrameOperationContext context, ICondition c);

Stop waiting for a condition that was sent to WaitForConditionUpdate. This allows the monitor to free any resources used to monitor the given condition.

All conditions (preconditions, post-conditions, selector node conditions) share these processing steps. Preconditions and post-conditions have additional processing steps.

1. The script engine moves to a state where it is required to evaluate a condition.
2. If the condition is not defined, the script engine takes a default action:
   a. Precondition: treat as though condition is TRUE and continue to process the frame.
   b. Post-condition: treat as though condition is FALSE and do not close the frame.
   c. Selector node condition: treat as though condition is TRUE and continue to process the selector node.
3. If the condition is defined, the script engine uses an internal lookup table to find the correct condition monitor.
   a. If there is no matching monitor, the script engine halts processing and raises an error.
   b. The script engine gives developers an API to register their own condition monitors. In this way developers can add their own condition types and can override the default implementation of any built-in condition monitor.
4. Evaluate the condition by calling CheckState above. If the condition evaluates to true:
   a. store any results in frame storage. The results are not persisted to persistent storage and so are only available as long as the frame is active in memory;
   b. if the condition is a frame precondition, continue processing the frame, otherwise wait (see below);
   c. if the condition is a frame post-condition, close the frame (deactivate resources, close all subframes) otherwise wait (see below);
   d. if the condition is a selector node condition, continue processing the selector node, otherwise stop processing the selector node.
5. If the condition is a precondition or post-condition and evaluates to false in step 4.
   a. Call WaitForConditionUpdate.
   b. Repeat 4-5.

A condition monitor may optionally generate a set of results when evaluating a condition via a call to CheckState. This is useful for interactive applications because it is often the case that the application is using a condition because it wishes to know if there are any data known to the application or one of its components that match a set of criteria. Any results are stored in the processing context for the frame. Any modules with access to this processing context can look up results in many ways, including but not limited to:
the condition that generated them;
the condition type that generated them; and
the type of the result data.

For example, a Location Condition is often used because the application developer would like to find a location meeting certain criteria and use it as a waypoint for a user. The developer specifies these criteria using a Location Condition, say: "Any coffee shop within 150 m of the player." The Location Condition Monitor queries its sources and, if there are any locations that match the description, returns them to the script engine in the onComplete callback for CheckState. The script engine stores these results in the frame processing context.

These results can be used in many ways. Three examples in a common implementation are described here.

Conditions used for Selectors

Condition results can be used by selectors to set script variables. Selectors may further refine the results for use by resources. For example, the Location Condition Monitor above may find several coffee shops within 150 m of the player. A Location Selector can be configured to choose only one, using a selection preference (e.g. nearest, farthest, or random). The selected location could be set to a script variable and, eventually, passed to a resource via variable mapping.

Other Conditions

Conditions may use the result of other conditions to further refine a scenario. For example, a condition "below" the Location Condition above could be defined to test the results for the name "Starbucks." In this case, "below" means another condition deeper in the script object tree with an ancestor object containing the original condition. This holds, for example, for:
- a precondition or postcondition on a subframe of a frame with the original condition as a precondition;
- a selector node with the original condition as its condition;
- a containing frame or any ancestor frame with the original condition as a precondition; or
- an ancestor selector node with the original condition as its condition.

Conditions used by Resources

A resource processor can use the results of a condition directly, however it is general practice to use a selector to choose amongst the results and set a variable that is mapped to a resource property using variable mapping.

SAMPLE IMPLEMENTATIONS

The relationship between the script engine and condition monitors allows most condition monitor implementations to be very simple.

Location Condition Monitor

CheckState

Query any location data sets for matching locations. If the number of matches >= the number requested, report back TRUE with the matching locations as the results. Otherwise report back FALSE.

WaitForConditionUpdate

Monitor the user's movement. If the user ever moves more than a configurable distance (say 50 m), re-evaluate all conditions and report any updates using the onUpdate callback.

Monitor the data sets. If any data set changes, re-evaluate all conditions and report any updates using the onUpdate callback.

DateTime Condition Monitor

Includes a date/time specification and an operator: before, after.

CheckState

Query the current time. If it is before or after the specified time (depending on the operator), report TRUE and set the matched time as a condition result.

WaitForConditionUpdate

If the operator is after and the time is in the future, set a timer to fire at the future time. On timer fire, call onUpdate.

Selectors

Selectors can adjust the properties of resources depending on conditions. This can dramatically simplify the structure of a script. Consider the scenario for a location-based game.
1. The author wants to give the player a task to do. The task should be performed when the player is at a particular location. This task is crucial to the flow of the game, so the author wants to make sure there's a fallback in case a suitable location can't be found. The task is assigned by delivering media to the player.
2. For example, the task may be to "hack" into a computer system and steal a bank record. (This is of course simulated, where "hacking" is simply an in-game activity that has no impact outside of the app itself.)
3. To make it feel more realistic, the author wants the player to complete the task at a bank or ATM if possible. But only if the user is within 250 m of a bank or ATM since the player is unlikely to walk much further than that.
4. If the player isn't near a bank or ATM, the system should look for any retail outlet within 200 m.
5. Failing that, the system should find any known location within 200 m.
6. Failing that, the system should choose a random location 100 m away and dress it up as a "hidden surveillance node."
7. The author wants the task title to reflect the type of location chosen.
    a. For bank or ATM: "Hack this ATM to get the bank record."
    b. For retail outlet: "Hack the payment system to download the character's bank record."
    c. For general location: "Hack the computer to see if the character has any old bank records saved."
    d. For randomly chosen location: "Hack into this government surveillance node to get access to the character's banking information."

Selectors can also adjust the properties of conditions or other selectors in the same way they adjust the properties of resources above.

This scenario could be built using only frames and preconditions as described above. However, this would result in a huge number of frames and conditions that would quickly become hard to manage. Furthermore, each frame would need to contain its own version of the hacking "task" resource with its location-specific title and any other resources that go along with it. Any change to the scenario would likely require editing the task in every frame.

Selectors allow the author to define the task once and then adapt its behavior based on conditions. Selectors do this by setting variables that are used by the resources to adjust their properties (this part of the process is described in more detail herein).

Selectors are stored in selector nodes. Selector nodes have the following structure, with some similarities (conditions and child nodes) to frames (pre-conditions and subframes):
1. A condition that determines whether or not to process the node. This condition can optionally be a compound condition.
2. A set of selectors that run when the node is processed and set script variables.
3. Child nodes that get processed when the parent node activates.
4. A rule that defines what it means for a node to be processed successfully.
5. A rule that defines in what order to process any child selector nodes.
6. A priority field (for priority processing order).
7. A weight field (for random processing order).

Processing a Selector Node
1. Evaluate the condition (if it exists). (A null condition may always evaluate to TRUE) In contrast to frame pre-conditions, DO NOT wait on the condition if it is FALSE. (The point here: selectors DO NOT halt the script processor waiting for a condition to be true. They only evaluate once, when the frame opens.)

If FALSE, processing this node FAILED. This may cause the frame processing to halt as described above.

If TRUE, continue processing.

2. Run any selectors. Note that a selector *may* fail. Selectors can be marked as "required." If any required selector fails, stop processing the node. This is treated the same as a failed condition. Selectors can be implemented in any way but it is recommended that a selector sets a single script variable on success.
3. Process child nodes from step 1. There are two parameters on a node that determine whether how to process the nodes and whether processing child nodes was successful:
   a. Processing rule:
      i. none: no rules, this node is considered successful no matter what the result of the child node processing is.
      ii. exactlyOne: this node is considered successful if exactly one of its child nodes processes successfully. The child nodes are processed in the order described below.
      iii. oneOrMore: this node is considered successful is at least one of its child nodes processes successfully.
   b. Processing order:
      i. sequence: nodes are processed in the order they are received.
      ii. priority: nodes have an optional "priority" field that defines the order.
      iii. random: nodes are selected using a weighted algorithm based on the value of their "weight" field.

In an alternative embodiment, when running a selector, a failed selector halts processing.

Activating Resources

Resources are arbitrary objects that hold data that is interpreted by the app in any way the app chooses. The script engine's simply "activates" resources by sending them to a "resource processor" that is specific to the resource type. (Every resource has a "type" parameter.)

When a resource's frame closes (meaning its post-condition is met), it is "deactivated." Again, the app can handle this any way it likes. It may ignore the deactivation and keep the resource active, it may undo any changes the resource made, etc. The script engine's only job is to report to the app when its resources activate and deactivate.

Adapting Resources with Variable Mappings

Resources can be adapted using Variable Mappings. Each resource has a "variableMappings" field that maps a Script Variable to a resource property. As an example:

1. A Location Selector sets a script variable named "Task Locations" to an array of Location objects. (Each Location object contains GPS coordinates, a name, a set of types describing the location, etc.)
2. A Location Task resource has a variable mapping that maps variable "Task Locations" to property "locations".
3. The Location Task "locations" property now holds an array of locations that was selected by the Location Selector.

Code (JSON notation):

```
Selector:
{
    type:"locationSelector",
    id:"locationSelector.123",
    variableName:"Task Locations",
    count:1
}
Resource:
{
    type:"locationTask",
    id:"locationTask.567",
    variableMappings:[
        {
            variableName:"Task Locations",
            property:"locations"
        }
    ],
    ...
}
```

Example 2

1. A Text Selector sets a script variable named "Task Title" to "Pick up item at the Starbucks".
2. A Location Task resource has a variable mapping that maps variable "Task Title" to its property "title".
3. The Location Task "title" property is now customized based on the value set by the selector.

```
Code
{
    type:"textSelector",
    id:"textSelector.8910",
    variableName:"Task Title",
    value:"Pick up item at the Starbucks"
}
Resource:
{
    type:"locationTask",
    id:"locationTask.567",
    variableMappings:[
        {
            variableName:" Task Title ",
            property:"title"
        }
    ],
    ...
}
```

Server-Delivered Scripts and Content

In this scenario the user is a developer building a Motive app on a client device. The developer is using Motive to define the interactive storytelling elements of the app.

1. Developer integrates Motive SDK component, including the Motive script processor, into her development environment. For example, in Unity the SDK is a .NET DLL that is included in the Unity project and exposes various features through a public API.
2. Developer uses the Motive API to have the app download Motive scripts and associated content on demand from the Motive server.
3. At any time before, during, or after app development and deployment, developer uses the Motive Website to author Motive Scripts.
4. When published, the scripts become available to the Motive app for download.
5. Motive app downloads these scripts and content as implemented in step 2 and passes them to the Motive Script Processor for processing.
6. The Motive Script Processor interprets the script and drives the interactive scenario.

Bundled Scripts and Content

This scenario is similar to (1) except that the developer bundles all of the generated scripts and content into the app binary itself. (The Motive Website offers this as a developer feature for "offline" scenarios.) This prevents on-demand downloads and prevents content from being added after the app is released, but also removes the reliance on the server for offline scenarios.

Combined 1 & 2

A combined solution that bundles some content and allows for other content to be delivered on demand from the Motive Server.

Resource Processor Implementation

Developer integrates Motive into his app using one of the scenarios defined above. Developer is building a simple app that uses the built-in behavior for the conditions and selectors used. (The Motive SDK will come with built-in condition monitors and selector processors for most of the types available through the authoring portal.) Developer only needs to add custom implementations for the various resource processors that manage the resources that will be activated. In this case, the developer is using Motive AR, a customized stack for building alternate reality location-based games. The implementation of the processors looks like this:

Location Task Processor: Location Tasks assign an action ("hack," "download," "upload," etc.) and a "collectible" (in-game item that can be collected) to a specific location. In this simple application, the developer shows the location on a map using its GPS coordinates and creates a UI element that allows the user to complete the task. Optionally, the user my need to be within a certain distance of the location to take an action.

Playable Content Processor: Playable Content represents any content that can be "played" in the UI. The developer writes a processor that handles the content based on type:

Video: play a full-screen video.

Audio: play the audio file through the speakers or headphones.

Image: display the image in a pop-up.

Inventory Collectible: Defines a collectible to be added to the inventory. The developer writes code to add the item to the inventory and displays a pop-up with a reward sound effect to alert the user.

The Motive Script Processor has no say over how these resources are processed. They can be handled in any way that is important to the app, including being ignored altogether.

It is also important to note how quickly the developer would be building interactive scenarios using only trivial implementations for these resource processors. Motive makes authoring the interactive scripts very easy to do and handles the hard work of evaluating and monitoring the conditions. The developer only needs to react to the resources that are activated by the script.

Location Condition Monitor Implementation

This is a simplified version of the default implementation of the Location Condition Monitor. The developer can extend this or replace the monitor altogether.

The location condition monitor determines whether or not a location condition is met. A location condition has the following fields:

| | |
|---|---|
| minDistance | Minimum distance from location |
| maxDistance | Maximum distance from location |
| count | How many locations have to meet the rest of the requirements |
| nameMatch | A string specifying a simple name match algorithm (i.e. location name contains nameMatch) |
| locationSource | Describes which data set to look at for locations |
| orLocationTypes | A set of location types, any of which can match (e.g. "coffee_shop," "restaurant," "casino") |

Consider the following location condition:
minDistance: 0
maxDistance: 300
count: 2
nameMatch: null
locationSource: locationCache
orLocationTypes: "cafe," "library"
This location condition will be met if the user is within 300 m of two locations, either of which can be a café or a library.

EVALUATE Implementation

Given: user's location, location cache populated with location data from a third party source (e.g. Foursquare™)

Do at least two of the locations in the location cache match the conditions specified? (Less than 300 m away, type is café or library)?

Return TRUE or FALSE

WAIT Implementation

On new data available (cache refreshed): re-run EVALUATE and report result (true or false) back to original caller On user travel 50 m (this is a tunable parameter): re-run EVALUATE and report result back to caller Selectors for Adapted Content This is a simplified example selector tree that could be used to select content based on location and time of day.

Table 1 shows a simplified example selector tree that could be used to select content based on location and time of day.

TABLE I

EXAMPLE SELECTOR TREE condition: none
selectors: none
rule: exactlyOne
order: priority
priority: 0
condition: 0-300 m of café
selector: select café location
rule: exactlyOne
order: sequence
priority: 0
condition: time frame: morning
selectors:
select message: "Good morning! Have a quick
shot of java to get going. . . "
priority: 0
condition: time frame: afternoon
selectors:
select message: "Good afternoon! Let's grab
a bite before we get going . . . "
priority: 10
condition: 0-200 m of any location
selectors:
select location
select message: "Here's a spot on the
map for you to investigate"

Figure 6A:
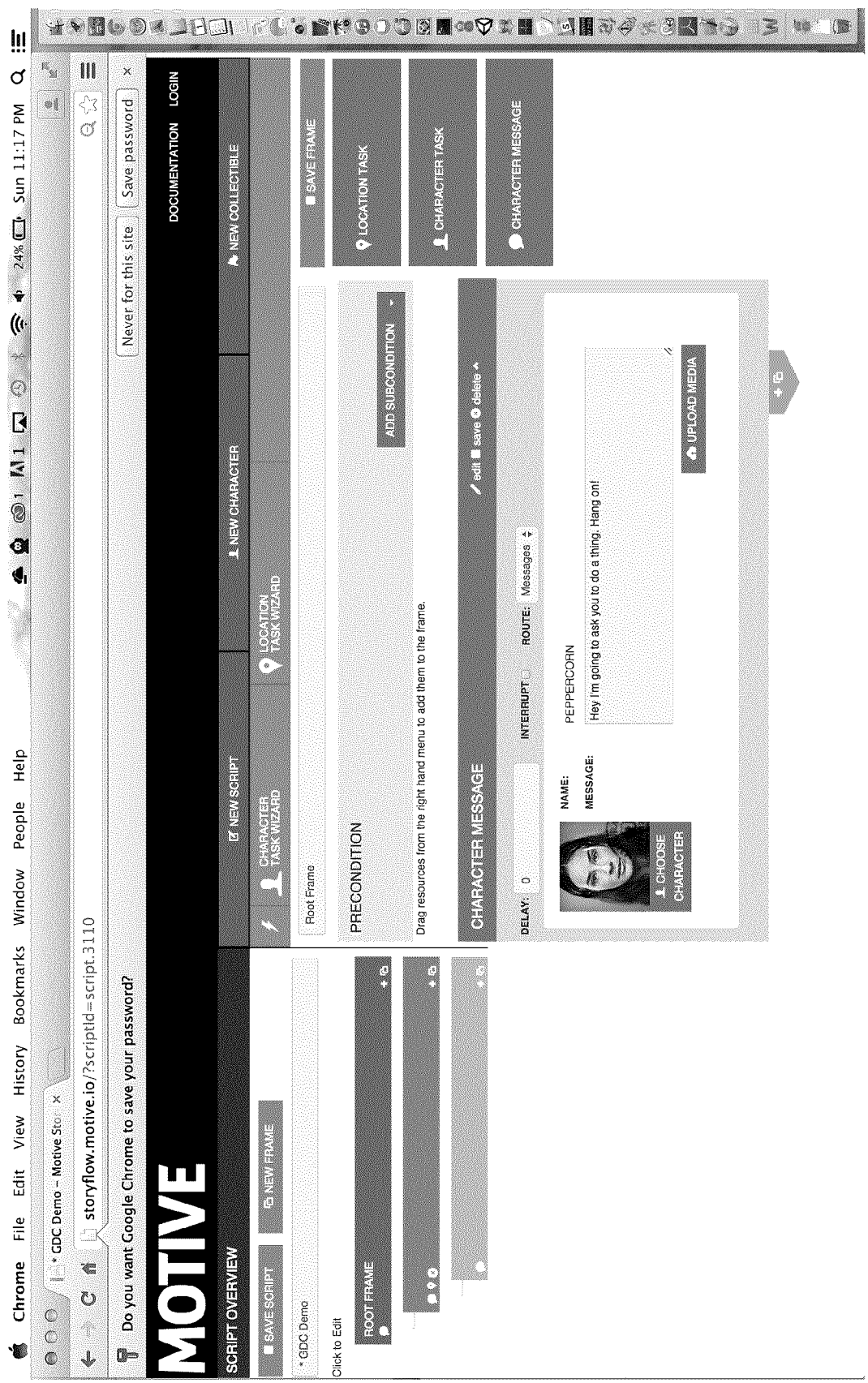
FIGS. 6A through 6E are screen shots showing parts of a simple example user interface.

FIGS. 6A through 6E illustrate a very simple example user interface which may be used by a designer in creating an interactive application. FIG. 6A shows an example editor window. The editor exits a single script. Frames of the script are represented by symbols on the left side of the window and are arranged in a hierarchy matching the frame-subframe tree. At any given time, a single frame is selected and is currently being edited in the main window. The main window shows preconditions and resources in this implementation. This implementation does not show post-conditions or selectors. Users may add more resources by dragging the corresponding template from the right pane. The frame being edited in the window shown in FIG. 6A has an empty precondition and one resource.

Figure 6B:
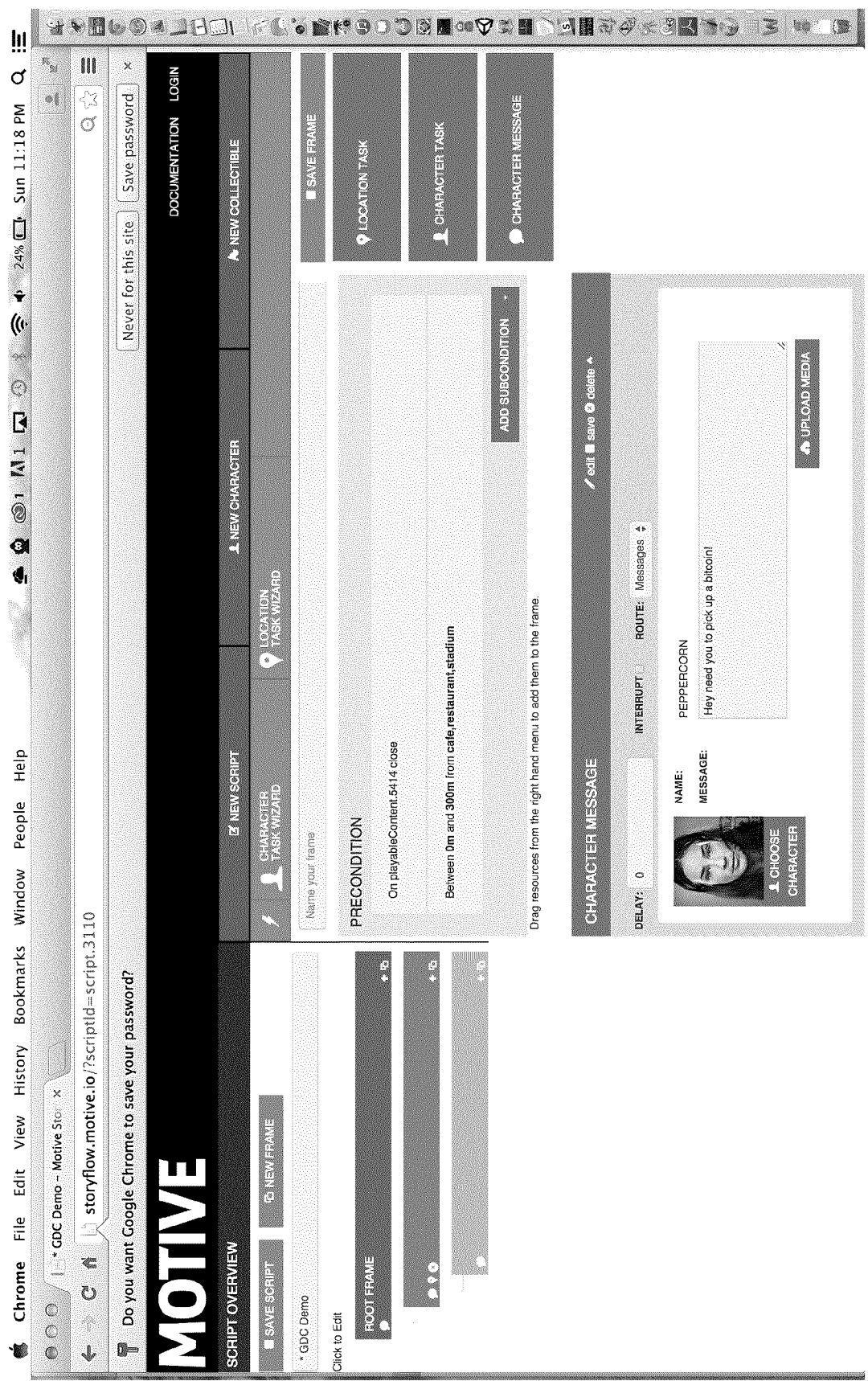
Figure 6C:
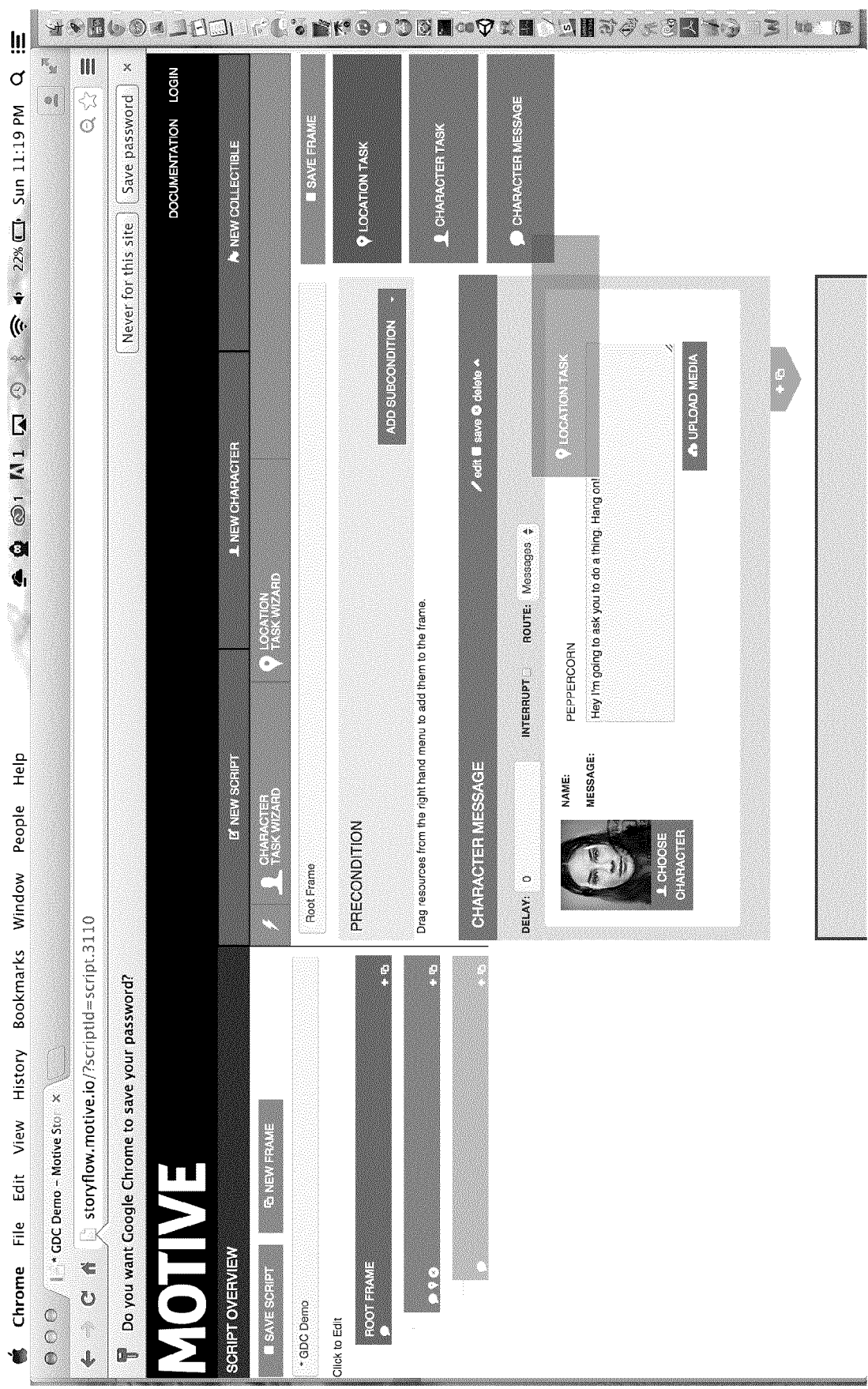

FIG. 6B shows an example of the editor being used to edit a frame with a compound condition.

scriptObjectCondition: on playable content close location-
    Condition: within 300 m of a café, restaurant, or a stadium
FIG. 6C shows feedback given by the user interface when a user is dragging a new resource into place.

Figure 6D:
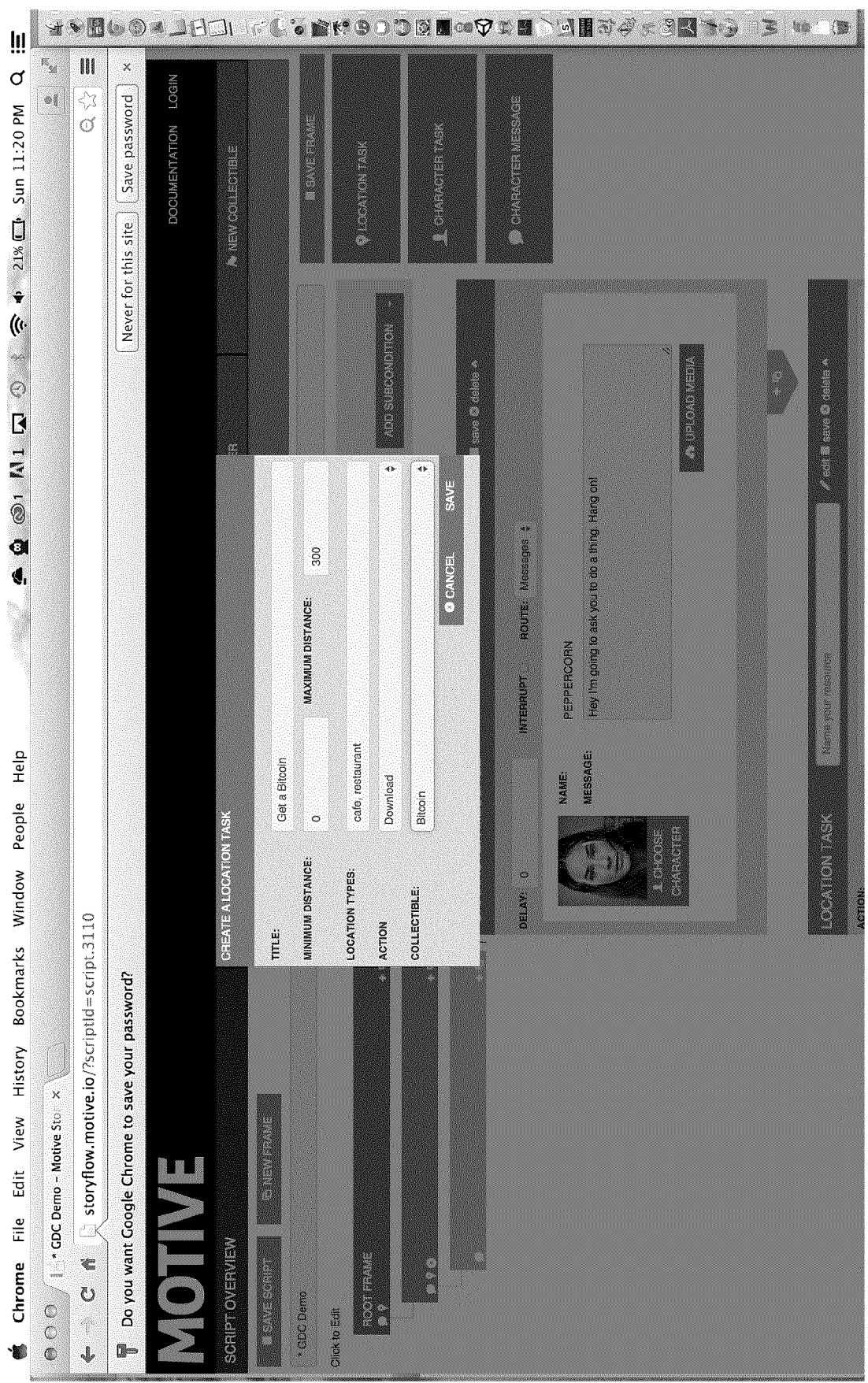

FIG. 6D shows an example Location Task wizard interface. This wizard:
    Adds a precondition to the frame depending on the settings in the Wizard user interface.
    Adds a selector tree with selector nodes that select the location to be used by the location task. (Selectors are not shown in this user interface.)
    Adds a locationTask representing the task for the user to do.
    Adds a locationCollectible, required to place a virtual item at the location used for the task.

Figure 6E:
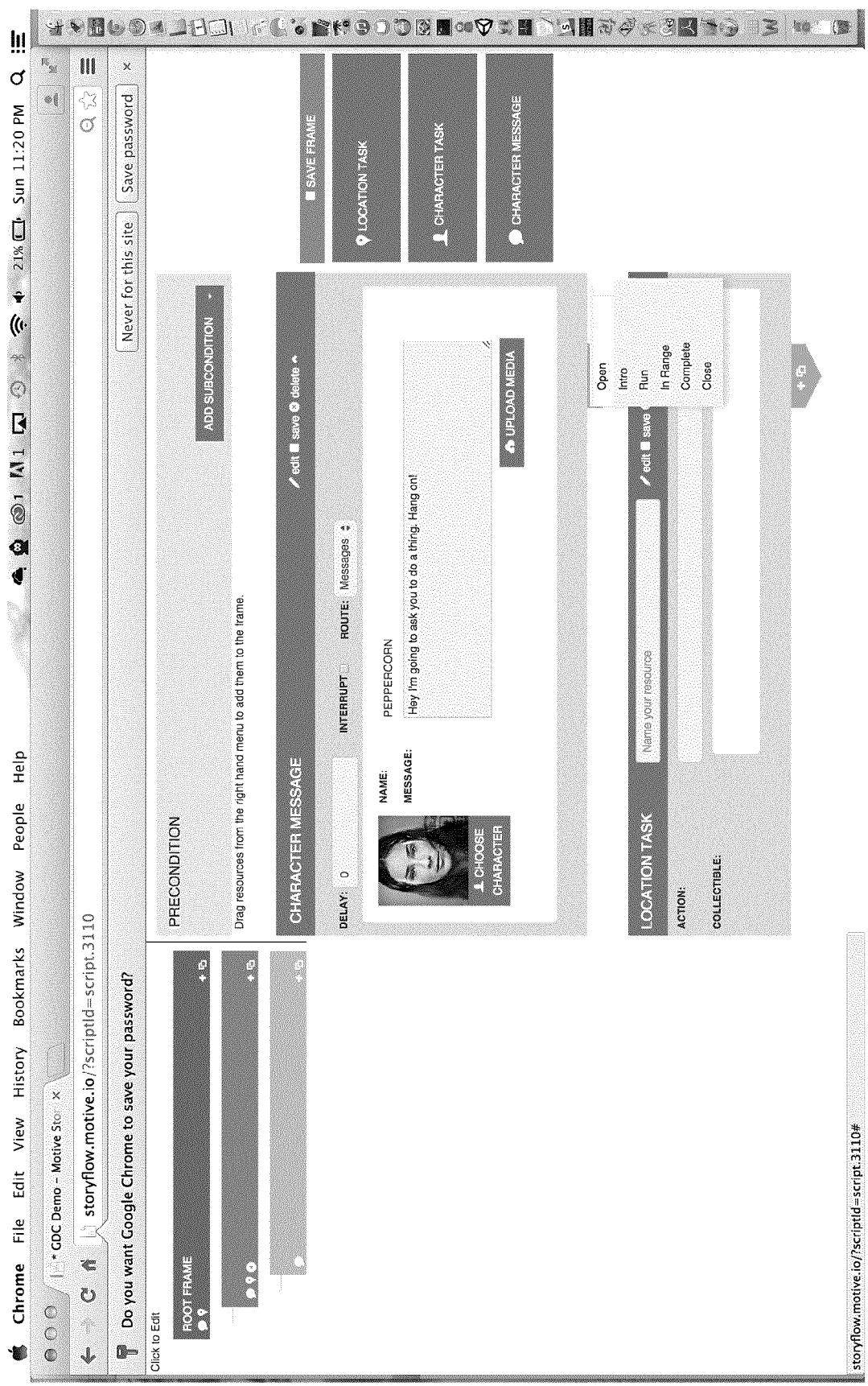

FIG. 6E shows an example Quick Link menu. This menu creates a subframe frame with a pre-condition (scriptObjectCondition) that is triggered off of the specified event from the selected object. This menu provides an easy way to perform the common task of linking an event from one object to opening a new frame. (e.g. "When the user reads the message, open another frame," or, "When the user completes the task, open another frame," etc.)

INTERPRETATION OF TERMS

Unless the context clearly requires otherwise, throughout the description and the claims:
    "comprise", "comprising", and the like are to be construed in an inclusive sense, as opposed to an exclusive or exhaustive sense; that is to say, in the sense of "including, but not limited to";
    "connected", "coupled", or any variant thereof, means any connection or coupling, either direct or indirect, between two or more elements; the coupling or connection between the elements can be physical, logical, or a combination thereof;
    "herein", "above", "below", and words of similar import, when used to describe this specification, shall refer to this specification as a whole, and not to any particular portions of this specification;
    "or", in reference to a list of two or more items, covers all of the following interpretations of the word: any of the items in the list, all of the items in the list, and any combination of the items in the list;
    the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on smartphones, wearable computers, servers, multi-processor systems, microprocessor-based or programmable consumer electronics, workstations, personal computers, tablet computers, PDAs, and other devices suitable for the purposes described herein.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. Apparatus for delivering content to a user, the apparatus comprising:
    a data processor;
    a data store operative to store a script comprising:
        a plurality of frames;
        a plurality of conditions of a plurality of types, wherein each of two or more of the frames comprises a corresponding one or more of the plurality of conditions as a precondition; and
        a plurality of resources,
    wherein each of one or more of the frames is associated with a corresponding one of the resources; and
    a script processor comprising executable computer code operative to process the script when executed by the data processor, the script processor configured to activate each of the two or more of the frames when the one or more conditions of the precondition corresponding to the frame is satisfied and to activate the corresponding one of the resources in response to the frame being activated such that any of the two or more of the frames is activated when the corresponding precondition is satisfied irrespective of the state of any other one of the two or more of the frames;
    a plurality of condition monitors comprising a first condition monitor configured to evaluate those of the conditions of a first type and a second condition monitor configured to evaluate those of the conditions of a second type different from the first type, wherein the first and second condition monitors each comprises executable computer code operative to independently evaluate conditions respectively of the first type and the second type when executed by the data processor and to communicate to the script processor when any of the conditions of the corresponding type are satisfied; and
    one or both of a display and a speaker;
    wherein for at least some of the resources activating the resource comprises displaying information corresponding to the resource on the display or producing a sound with the speaker or both; and
    wherein at least a first one of the one or more frames comprises a selector associated with a corresponding one of the conditions, the selector being operative to set a value of a script variable if the one of the conditions corresponding to the selector is satisfied and wherein for at least one of the resources associated with the first one of the one or more frames, activating the resource comprises setting a property of the resource based on the value of the script variable wherein for at least one of the resources the property of the resource alters information displayed on the display by activating the resource.

2. Apparatus according to claim 1 wherein the selector is one of a plurality of selectors associated with a selector node of the frame.

3. Apparatus according to claim 2 wherein the frame stores a priority order for operation of the plurality of selectors.

4. Apparatus according to claim 2 wherein the frame includes an indication that the plurality of selectors should be operated in a random order and the script processor is configured to determine an order at random for operating the plurality of selectors.

5. Apparatus according to claim 2 wherein each of the plurality of selectors is associated with one of the conditions and the script processor is configured to conditionally execute the selector to set the value of a corresponding script variable depending on whether or not the corresponding condition is satisfied.

6. Apparatus according to claim 2 wherein the script provides an order for the plurality of selectors, at least some of the plurality of selectors include a selector condition, at least one of the selector conditions is based on a result of executing another one of the plurality of selectors earlier in the order and the script processor is configured to execute the selectors in the order until the script processor detects that the selector condition for the next one of the selectors in the order is not satisfied.

7. Apparatus according to claim 6 wherein the apparatus comprises a location determination system and a wireless data communication interface, at least a first one of the plurality of selectors is configured to query an internet resource by way of the data communication interface using a current location of the apparatus determined by the location determination system and the first one of the selectors is configured to set a script variable based on a response to the query.

8. Apparatus according to claim 6 wherein the script provides a default value for a script variable and the script processor is configured to set the script variable to the default value if all of the plurality of selectors fail.

9. Apparatus according to claim 1 comprising a location determination system.

10. Apparatus according to claim 9 wherein the apparatus comprises a wireless data communication interface and one or more of the condition monitors is configured to query an internet resource by way of the data communication interface using a current location of the apparatus determined by the location determination system and to evaluate a condition based at least in part on a response to the query received from the internet resource by way of the data communication interface.

11. Apparatus according to claim 10 wherein the internet resource comprises a state machine representing a shared state of an interactive application and the response to the query comprises an indication of the shared state.

12. Apparatus according to claim 10 wherein the internet resource comprises a weather service and the response to the query comprises current weather information for the current location of the apparatus.

13. Apparatus according to claim 1 wherein at least one of the conditions is associated with a corresponding default resource and the script processor is configured to activate the default resource if the at least one of the conditions cannot be evaluated.

14. Apparatus according to claim 1 wherein each of the condition monitors is provided by a distinct software process.

15. A method for delivering content to a user by way of a portable apparatus, the method comprising:
 receiving at the portable apparatus a script comprising:
  a plurality of frames;
  a plurality of conditions of a plurality of types, wherein each of two or more of the frames comprises a corresponding one or more of the plurality of conditions as a precondition; and
  a plurality of resources,
 wherein each of one or more of the frames is associated with a corresponding one of the resources;
 providing the conditions to a plurality of condition monitors in the portable apparatus, the plurality of condition monitors comprising a first condition monitor configured to evaluate those of the conditions of a first type and a second condition monitor configured to evaluate those of the conditions of a second type different from the first type, wherein the first and second condition monitors are operative to independently evaluate conditions respectively of the first type and the second type;
 activating each of the two or more of the frames when the one or more conditions of the precondition corresponding to the frame is satisfied and to activate the corresponding one of the resources in response to the frame being activated such that any of the two or more of the frames is activated when the corresponding precondition is satisfied irrespective of the state of any other one of the two or more of the frames;
 wherein for at least some of the resources activating the resource comprises displaying information corresponding to the resource on a display or producing a sound with a speaker or both; and wherein at least a first one of the one or more of the frames comprises a selector associated with a corresponding one of the conditions, the selector being operative to set a value of a script variable if the one of the conditions corresponding to the selector is satisfied and wherein for at least one of the resources associated with the first one of the one or more frames, activating the resource comprises setting a property of the resource based on the value of the script variable wherein for at least one of the resources the property of the resource alters information displayed on the display by activating the resource.

16. A method according to claim 15 wherein the selector is one of a plurality of selectors associated with the frame.

17. A method according to claim 16 wherein the frame stores a priority order for operation of the plurality of selectors and the method processes the plurality of selectors in the order.

18. A method according to claim 16 wherein the frame includes an indication that the plurality of selectors should be operated in a random order and the method comprises processing the plurality of selectors in a randomly determined order.

19. A method according to claim 16 wherein each of the plurality of selectors is associated with a selector condition and the method comprises conditionally executing the selector to set the value of a corresponding script variable depending on whether or not the corresponding selector condition is satisfied.

20. A method according to claim 18 wherein for at least one of the selectors the selector condition is based on an output of a previously-processed selector.

21. A method according to claim 16 wherein the script provides an order for the plurality of selectors, at least some of the plurality of selectors include a selector condition, at least one of the selector conditions is based on a result of executing another one of the plurality of selectors earlier in the order and the method comprises executing the selectors in the order until the selector condition for the next one of the selectors in the order is not satisfied.

22. A method according to claim 21 wherein processing a first one of the plurality of selectors comprises querying an internet resource using a current location of the portable apparatus and setting a script variable based on a response to the query.

23. A method according to claim 22 wherein the internet resource comprises a state machine representing a shared state of an interactive application and the response to the query comprises an indication of the shared state.

24. A method according to claim 22 wherein the internet resource comprises a weather service and the response to the query comprises current weather information for the current location of the apparatus.

25. A method according to claim 15 wherein at least one of the conditions is associated with a corresponding default resource and the script processor is configured to activate the default resource if the at least one of the conditions cannot be evaluated.

26. A method for providing computer-delivered interactive content, the method comprising:
 receiving at a user interface user control inputs and configuring a frame of a script based on the user control inputs, the frame comprising:
  a precondition;
  one or more selectors; and
  a linked resource;

the user control inputs comprising:
- one or more inputs selecting a type for the precondition from among a plurality of predefined types and one or more type-dependent parameters for the precondition, each type independent of the other types in the plurality of predefined types;
- one or more inputs selecting a type or types for the one or more selectors from among a plurality of predefined selector types and corresponding values for one or more script variables to be output by the one or more selectors; and
- one or more inputs selecting a resource to be linked to the frame;

generating a script based on the control inputs the script comprising a plurality of frames wherein one of the frames comprises a precondition having a selected type, a selector of the selected type and a link to a selected resource; and making the script available for download on a server computer.

27. A method according to claim 26 wherein the selector of the one of the frames is associated with a selector condition and the method comprises setting the selector condition based upon the user control inputs.

28. A method according to claim 26 wherein the selector of the one of the frames is one of a plurality of selectors all associated with the at least one of the frames and each of the selectors is associated with a different selector condition and the method comprises setting the selector conditions based on the user control inputs.

* * * * *